United States Patent [19]

Zucker et al.

[11] 3,960,227
[45] June 1, 1976

[54] HIGH SPEED WEIGHING SCALE

[75] Inventors: Fredric E. Zucker, Stamford, Conn.;
Anthony Storace, Tarrytown, N.Y.;
Paul R. Sette, Hamden, Conn.

[73] Assignee: Pitney-Bowes, Inc., Stamford, Conn.

[22] Filed: Mar. 28, 1975

[21] Appl. No.: 563,192

Related U.S. Application Data

[62] Division of Ser. No. 522,712, Nov. 11, 1974, which is a division of Ser. No. 476,655, June 5, 1974.

[52] U.S. Cl. .............................. 177/210; 177/229; 177/262; 177/DIG. 6
[51] Int. Cl.² ...................... G01G 3/14; G01G 3/08; G01G 21/22
[58] Field of Search .................. 177/1, 3, 225, 229, 177/210, 262, DIG. 6; 198/39

[56] References Cited
UNITED STATES PATENTS

| | | | |
|---|---|---|---|
| 3,220,550 | 11/1965 | Gilbert | 177/50 X |
| 3,648,839 | 3/1972 | Bradshaw et al. | 177/1 X |
| 3,724,570 | 4/1973 | Chenut | 177/50 X |

*Primary Examiner*—George H. Miller, Jr.
*Attorney, Agent, or Firm*—William D. Soltow, Jr.; Albert W. Scribner; Robert S. Salzman

[57] ABSTRACT

A high speed weighing scale for use in a continuous mail sorting and postage imprinting system which automatically weighs and meters each piece of mail. The system is designed to rapidly handle a large quantity of mixed mail. Mixed mail is continuously and synchronously fed in seriatim along a continuous feed path. Unsealed envelopes have their flaps wetted and sealed. All the envelopes are stopped at a weighing station where they are weighed, and the postage corresponding to their particular weight is computed. The determined postage value is used to continuously reset a postage meter which imprints the required postage upon each envelope as it arrives at a metering station. The metering and weighing functions of the system are synchronized such that the postage meter will imprint the proper postage upon each piece of mail, despite the fact that several envelopes may be simultaneously in transit along the feed path. Overweight pieces of mail are rejected from the feed path prior to their reaching the postage meter station. Metered and overweight pieces of mail are separately stacked.

10 Claims, 30 Drawing Figures

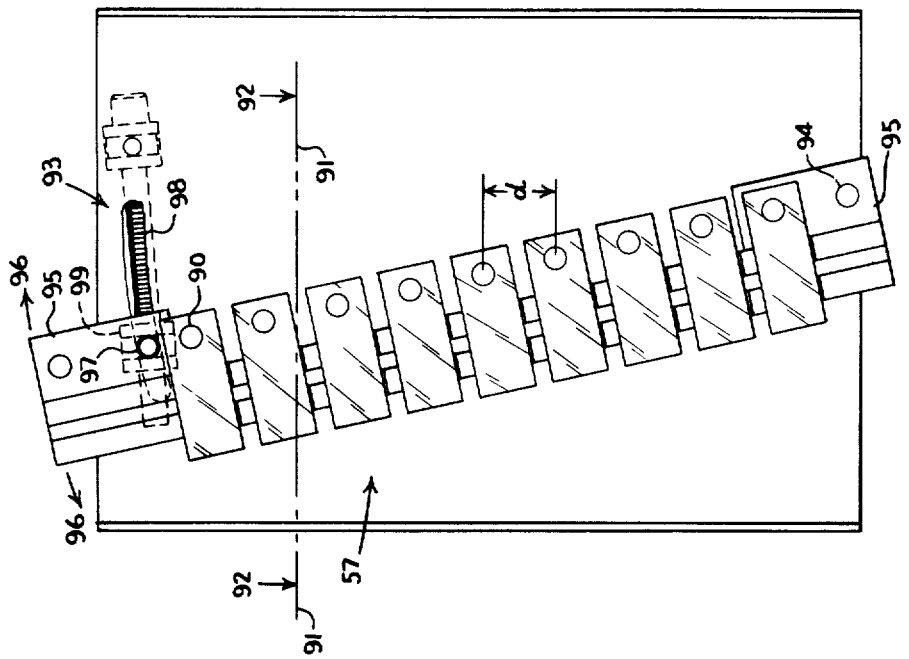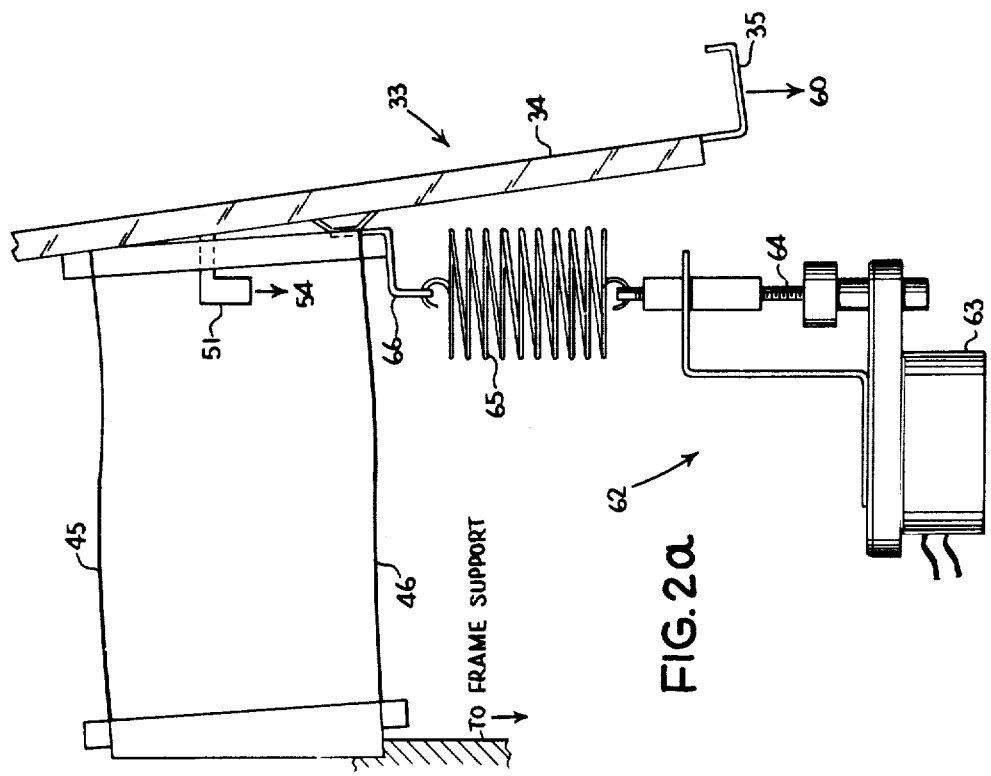

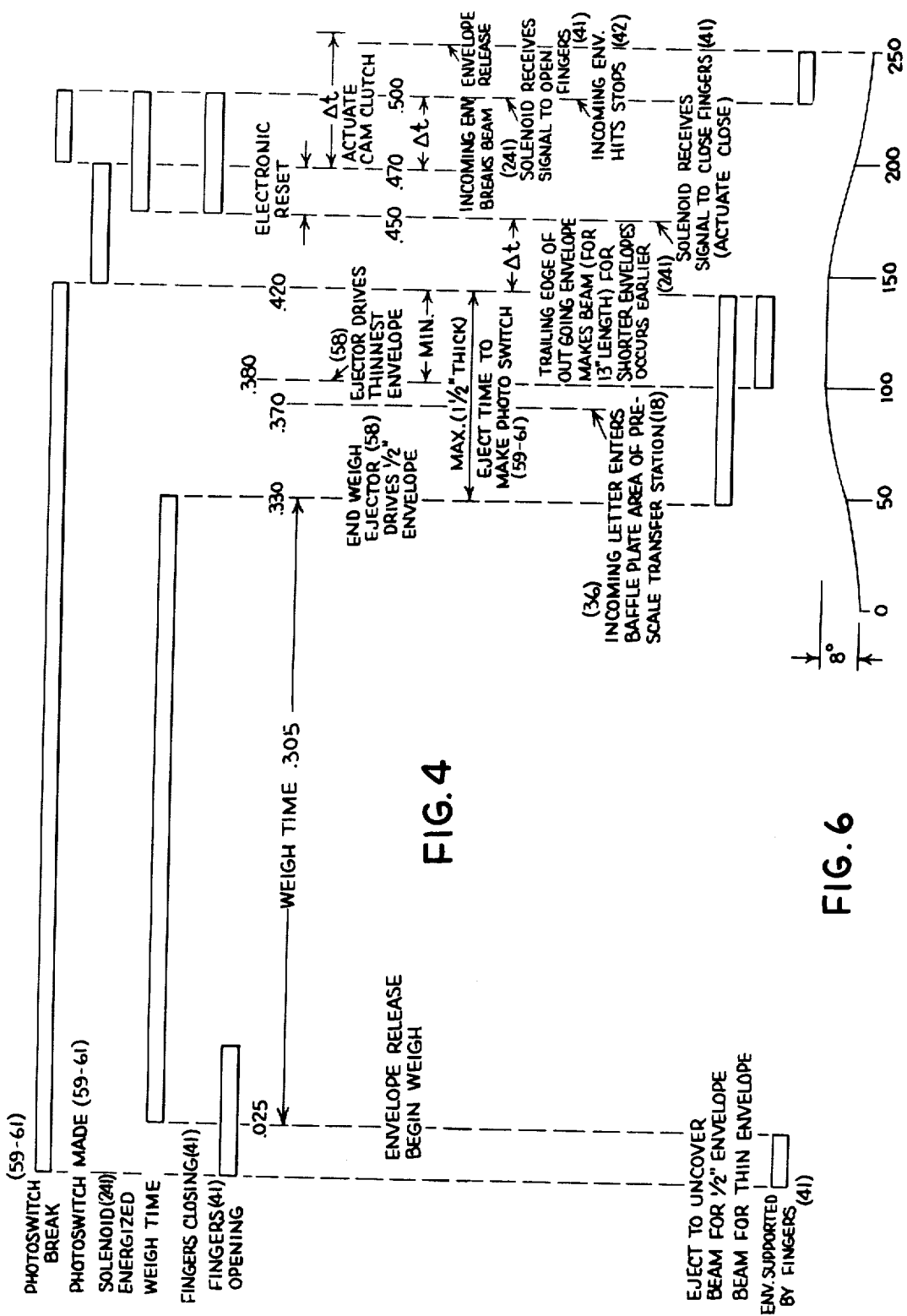

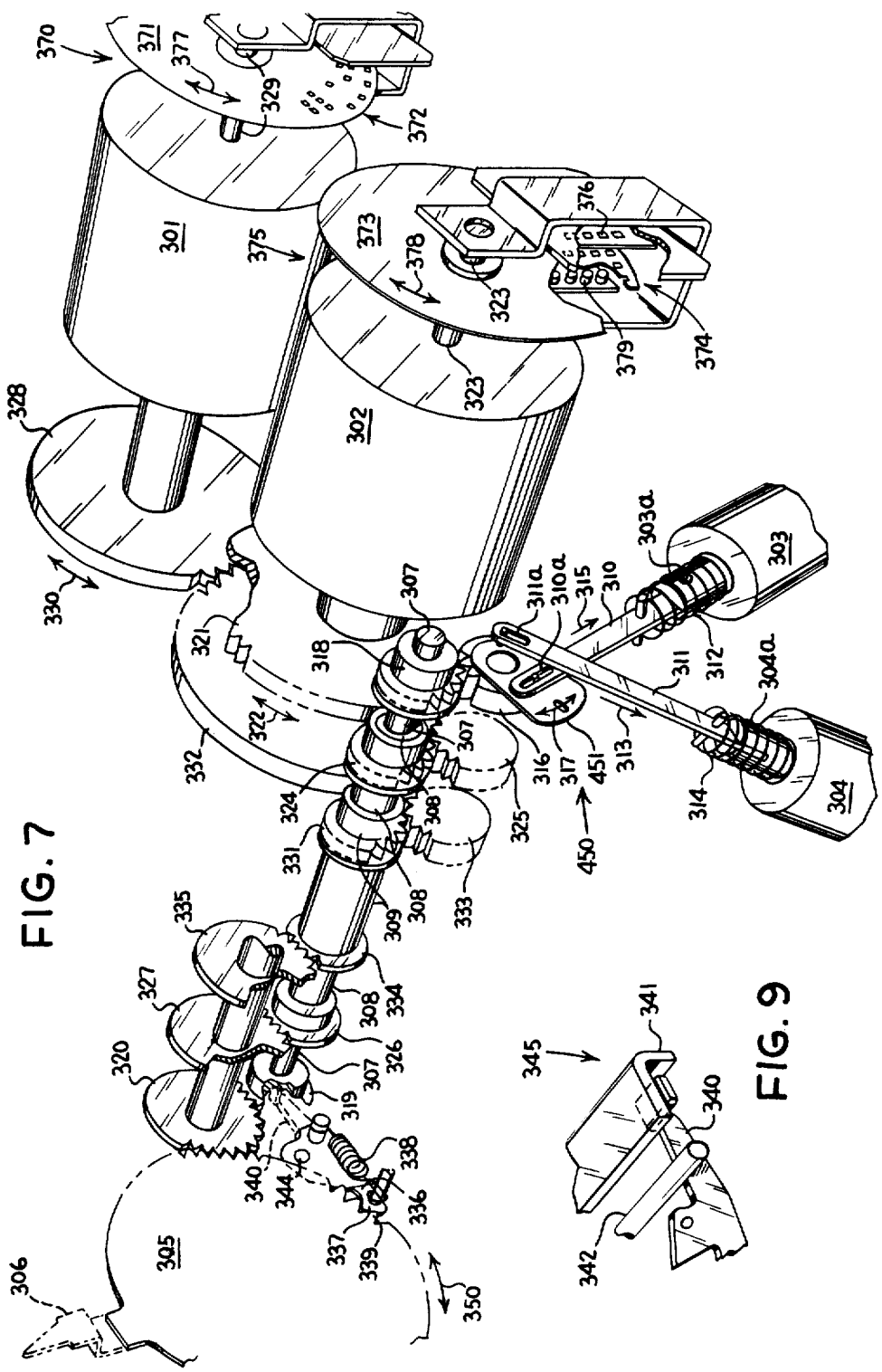

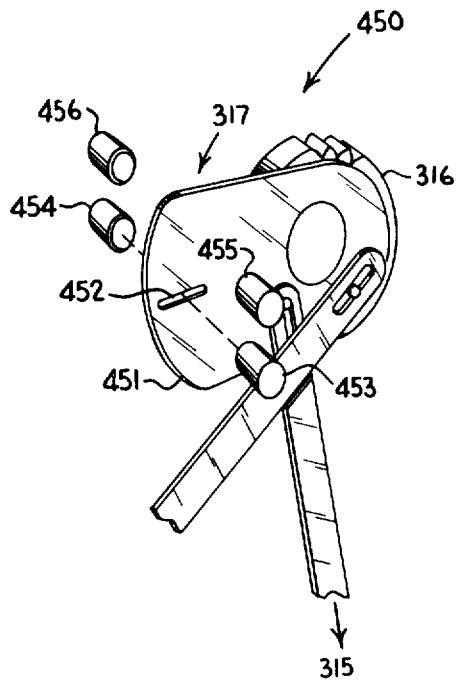
FIG. 7b
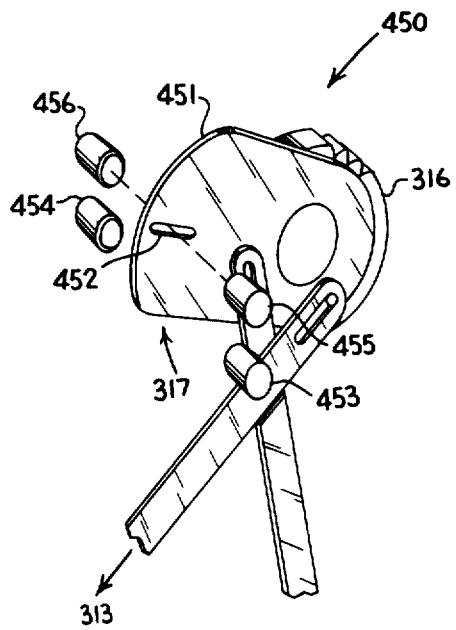
FIG. 7a
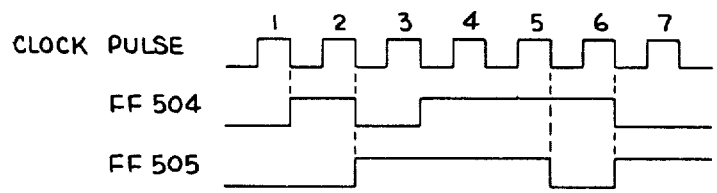
FIG. 13
| 11a | 11c |
|-----|-----|
| 11b | 11d |
FIG. 11a,b,c,d
FIG. 11e

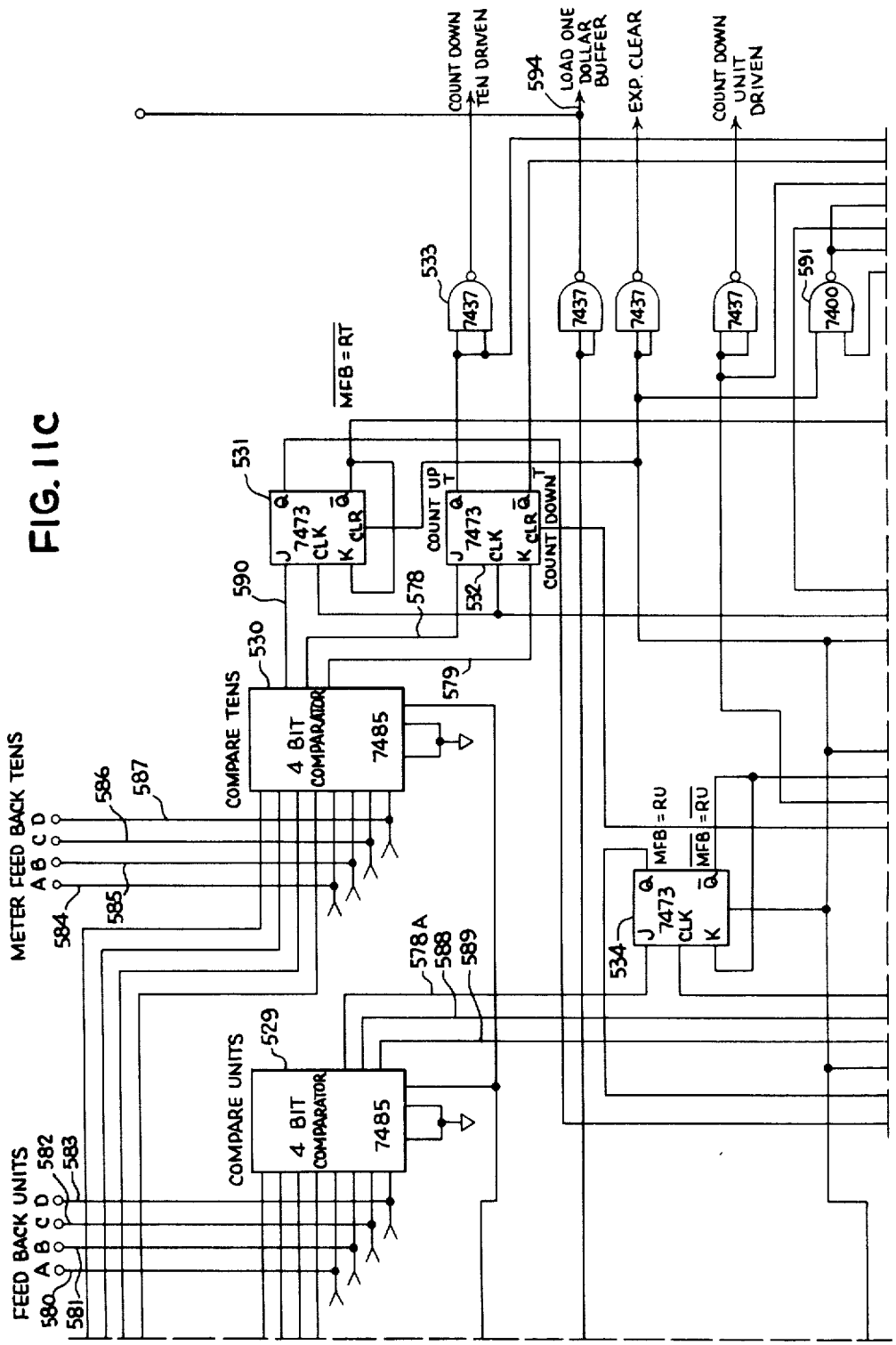

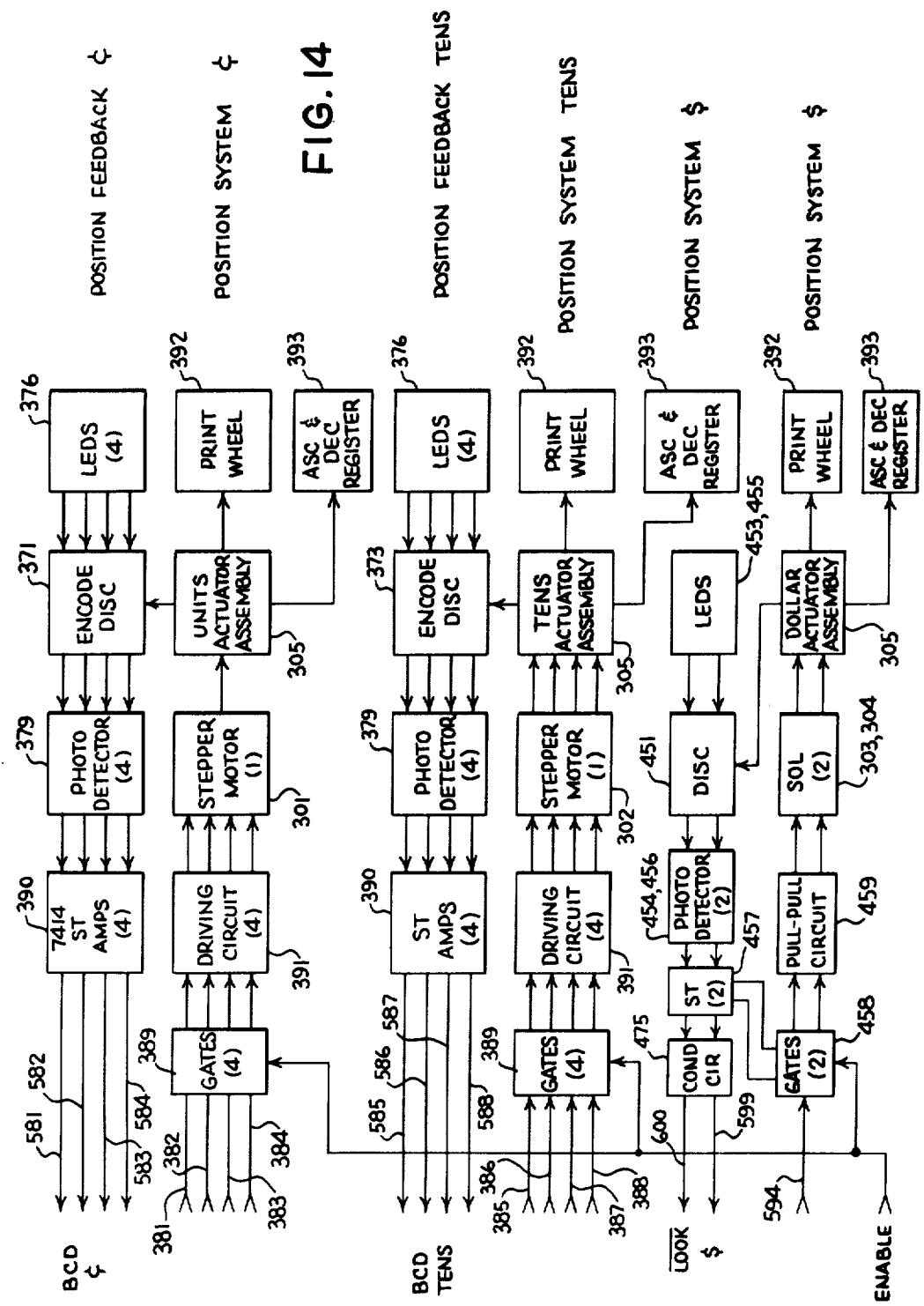

HIGH SPEED WEIGHING SCALE

This is a division of application Ser. No. 522,712 filed Nov. 11, 1974, which is a division of application Ser. No. 476,655 filed June 5, 1974.

The invention pertains to continuous mail handling systems, and more particularly to a continuous, synchronous, automatic mailing system for sorting and imprinting postage for a large quantity of mixed mail.

BACKGROUND OF THE INVENTION

The assignee of the present invention has long been involved in providing mailing machines and systems for Government and industry, which efficiently and expeditiously handle all types of mailing needs. One of the areas of mail handling which has yet to be extensively explored, is the automatic handling of both sealed and unsealed mixed mail, and the elimination of interfacing between the machine operator and the postage meter.

Heretofore, many errors have occurred in the handling of mail, wherein the postage machine operator miscalculated the required postage, or accidentally set the mailing machine with the wrong postage value.

It is quite common for many large companies and stock brockerage firms to send millions of pieces of mail to their stockholders and clients at one time. Thus, if an error in postage is made, it may cost the company large losses. It has been known for an operator of a mailing machine to have misplaced a decimal point when setting a mailing run of millions of letters, which resulted in a substantial loss to the company.

Because the needs and requirements of businesses are expanding rapidly, there exists now more than ever, a need for more efficient and efficacious methods of handling mail, and for systems which will eliminate human error, while handling all forms and types of mail.

The present invention was conceived and designed to provide a system which would automatically handle in a continuous synchronized stream, a large quantity of mixed mail, and which would eliminate the interfacing between the machine operator and the postage meter.

PRIOR ART

In the past, many machines have been devised which automatically sort mail according to their weight. Such systems, however, do not have controls for automatically imprinting the correct postage upon the sorted mail or transporting pieces of mail in a synchronized fashion. One such prior art system can be seen with reference to the patent to: J. J. GILBERT; U.S. Pat. No. 3,220,550; issued: Nov. 30, 1965.

Another device which has some similarity with the present invention can be seen in the patent to: R. G. SCHMOLLINGER; U.S. Pat. No. 3,447,528; issued: Nov. 11, 1969.

The above-mentioned device is for a stationary mail handling machine which automatically adjusts a postage meter in response to the weighing of a letter. This device, however, does not continuously process large quantities of mail, nor does it have the response time necessary to be so modified.

The present inventive system actually computes the postage required, whereas the above prior art device sets the meter by direct linkage from a scale. While a direct linkage is a considerably simpler operation, it is too slow for processing a huge volume of mail.

Because the present invention uses high speed conveying techniques to rapidly process the mail, there is a need in the system for a reliable means of conveying and synchronizing the individual pieces of mail so that they may be properly transported, weighed, and imprinted with postage. Two prior art references which show conveying of pieces of mail may be seen with reference to the patents of: E. W. TANGARD: U.S. Pat. No. 2,970,684; issued: Feb. 7, 1961; and E. SATHER et al.; U.S. Pat. No. 3,606,728; issued: Sept. 21, 1971.

The TANGARD Patent shows a system for mechanically conveying and sorting mail in a randomized fashion. The instant inventive system synchronizes the mail electronically, so that there is a controlled stream of mail through the system. The feed path of the present inventive system has a series of stations which are synchronously cooperative to provide a steady stream of mail, i.e. several letters are in transit along the feed path at one time, with each letter being fed to a succeeding station when that station is free.

The SATHER, et al. system is for a system wherein several documents are separately conveyed and stuffed within envelopes. Over-weight envelopes are rejected. There is no means in this system for controlling the amount of postage imprinted in response to the weight of a letter, nor means for synchronzing the flow of multiple pieces of mail in transit from a weighing station to a postage meter station.

The present invention also features a decelerating device of the type shown in the patent to: D. A. BEYTES; U.S. Pat. No. 3,016,126; issued: Jan. 9, 1962.

Like this invention, the mail in BEYTES is fed edgewise into a pair of fingers. The instant invention, however, provides spring-loaded stopping fingers which have an involute surface containing hook-like apurtenances which prevent the letter from backing out from between the fingers.

The instant inventive system is also characterized by a novel movable printing deck not unlike the device shown in the patent to: F. J. ROUAN; U.S. Pat. No. 2,273,289; issued: Feb. 17, 1942.

The device shown by ROUAN is not for the present inventive purpose of providing a uniform imprinting force upon different thicknesses of mixed mail. The present inventive deck, additionally has the novel feature of uniformity of deflection over its entire envelope engaging surface.

SUMMARY OF THE INVENTION

The instant invention is for a continuous, synchronized, mail handling method and system for automatically processing a large quantity of mixed mail.

The inventive system is designed to weigh and imprint the proper postage value upon 7,000 units of mixed mail per hour. The invention features a weighing scale which will weigh a letter within 0.3 seconds, and imprint the postage upon the weighed letter within a maximum of 190 milli-seconds.

The system will process sealed and unsealed envelopes, and sort and separately stack mail in excess of 8 oz. of weight.

A quantity of mixed mail is continuously fed in seriatim along a continuous feed path. Each piece of mail is delivered to a weighing station disposed along the feed path, where it is weighed, and the amount of postage needed for each weighed piece is determined. Each weighed piece of mail is then delivered to a postage meter station, where each piece of mail is imprinted with a controlled amount of postage corresponding with the determined amount of postage.

The invention features many novel features, some of which are:

a. a high speed leaf spring scale having an automatic zero adjustment, a means for adjusting for differences in linearity of the spring rate of the leaf springs, a non-linear damping adjustment, and isolation from external influences.

b. a high speed postage meter whose imprint wheels are bi-directionally settable by means of stepper motors;

c. control and computation circuitry for converting the deflection of the scale into a postage determination of the required postage. Means are provided for generating a number of stepper motor pulses for setting the postage meter. A feed-back circuit provides that each motor is stepped directly from its old postage value position, to a new postage value position. Thus, the meter wheels are each set using the shortest incremental path;

d. Synchronization circuitry is provided for coordinating the weighing station with the postage meter station, such that:

1. information of the determined postage for each piece of mail corresponds with the postage being imprinted on the particular piece of mail delivered to the postage meter; and 2. each piece of mail is transported along the feed path with a controlled high speed traffic pattern, so that no jamming or confusion of information will occur between pieces of mail moving in the system.

e. a movable imprinting deck secures each piece of mail for imprinting, such that each piece of mail receives a uniform imprint of postage irregardless of the thickness of the letter; and f. a unique decelerating mechanism comprising several pairs of spring-biased fingers for stopping moving mail at the weighing station. Each pair of fingers has an involute mail engaging surface with projecting hook-like appurtenances, for preventing bouncing and "backing-out" of the incoming letter.

It is an object of this invention to provide an improved continuous, automatic mail handling system and method;

It is another object of the invention to provide a continuous automatic mail handling system which will process a large volume of mixed mail;

It is still another object of this invention to provide a continuous automatic mixed mail handling system which will eliminate interfacing between the mail handling operator and the postage meter.

These and other objects of the invention will be more easily understood and become more apparent with reference to the following detailed description taken in conjunction with the accompanying drawings, in which:

FIG. 2a is a side view of a portion of the scale of the weighing apparatus of FIG. 2, depicting a zero-adjustment mechanism;

FIG. 2b is a side view of another portion of the scale of the weighing apparatus of FIG. 2, illustrating an adjustable photodetector mechanism;

FIG. 4 is a timing diagram showing the timing sequence of the stopping, weighing, and ejecting operations of FIGS. 3a through 3d;

Figure 1:
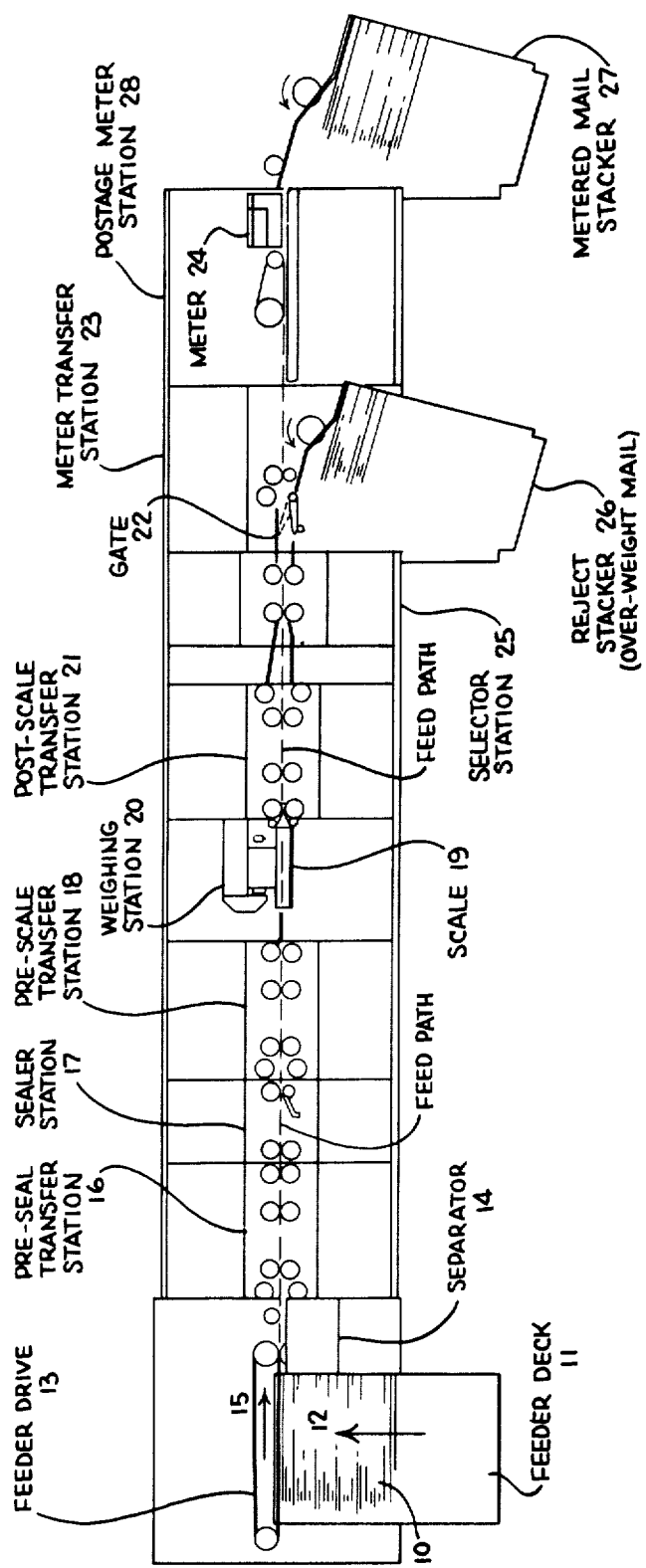
FIG. 1 is a schematic diagram of the mixed mail handling system of this invention.
Figure 5:
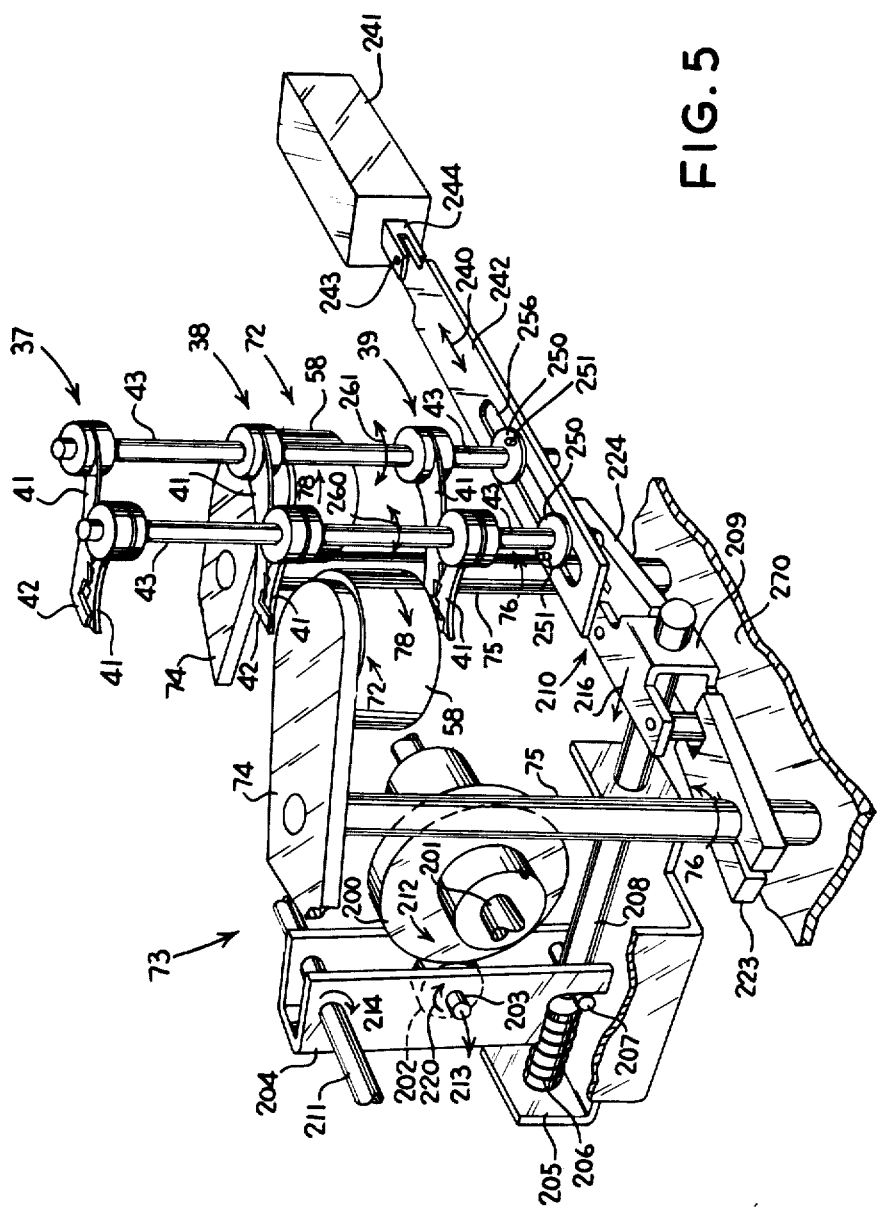
Figure 10:
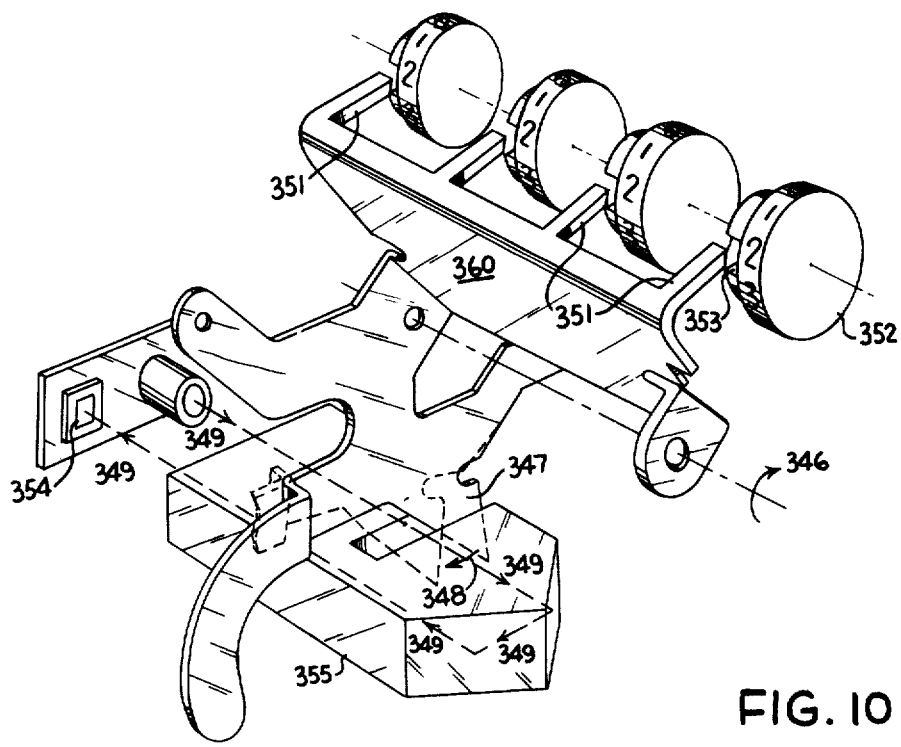
Figure 8:
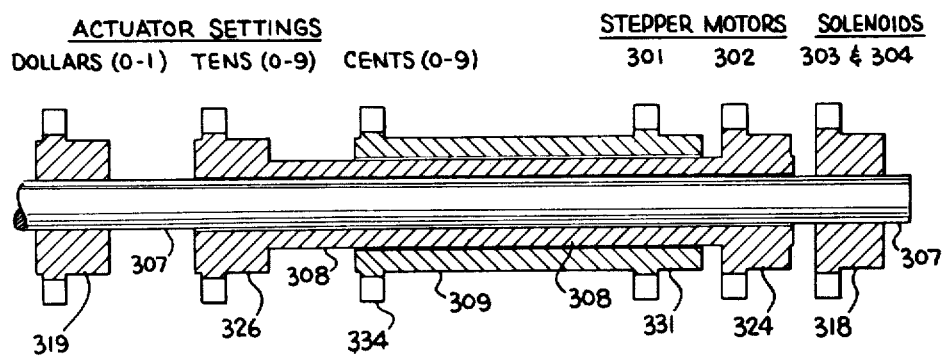
Figure 11A:
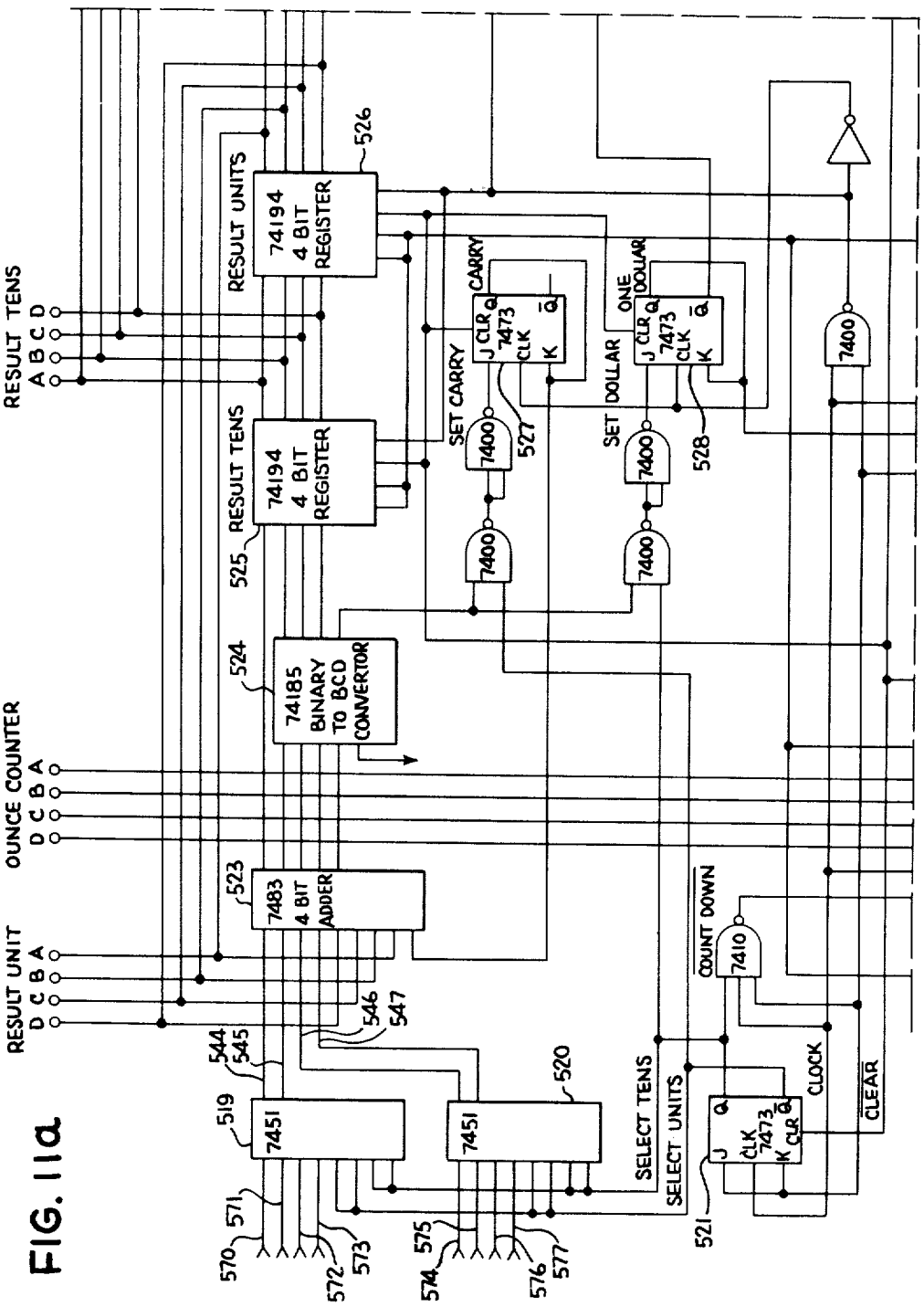
Figure 12:
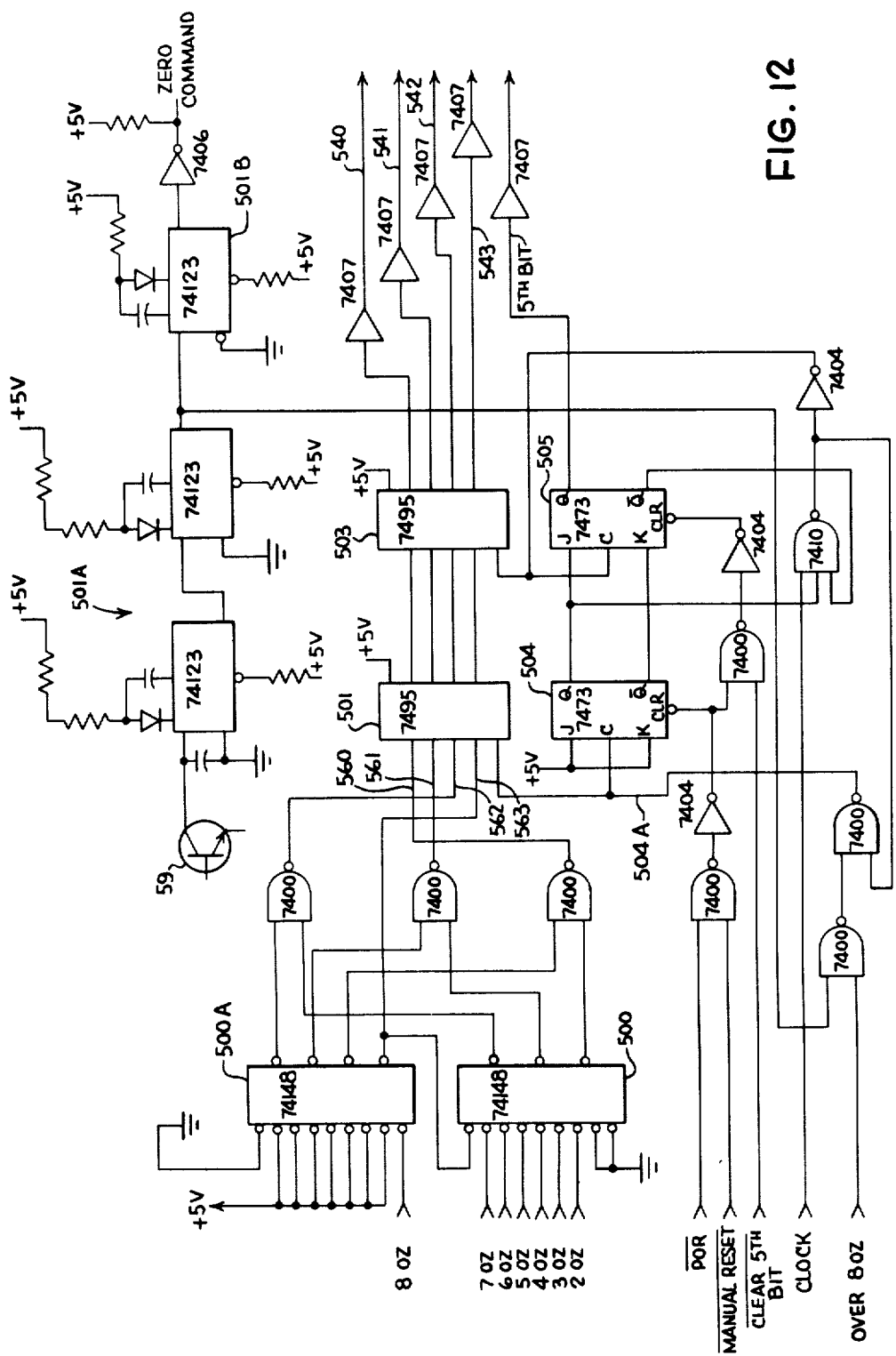
Figure 15:
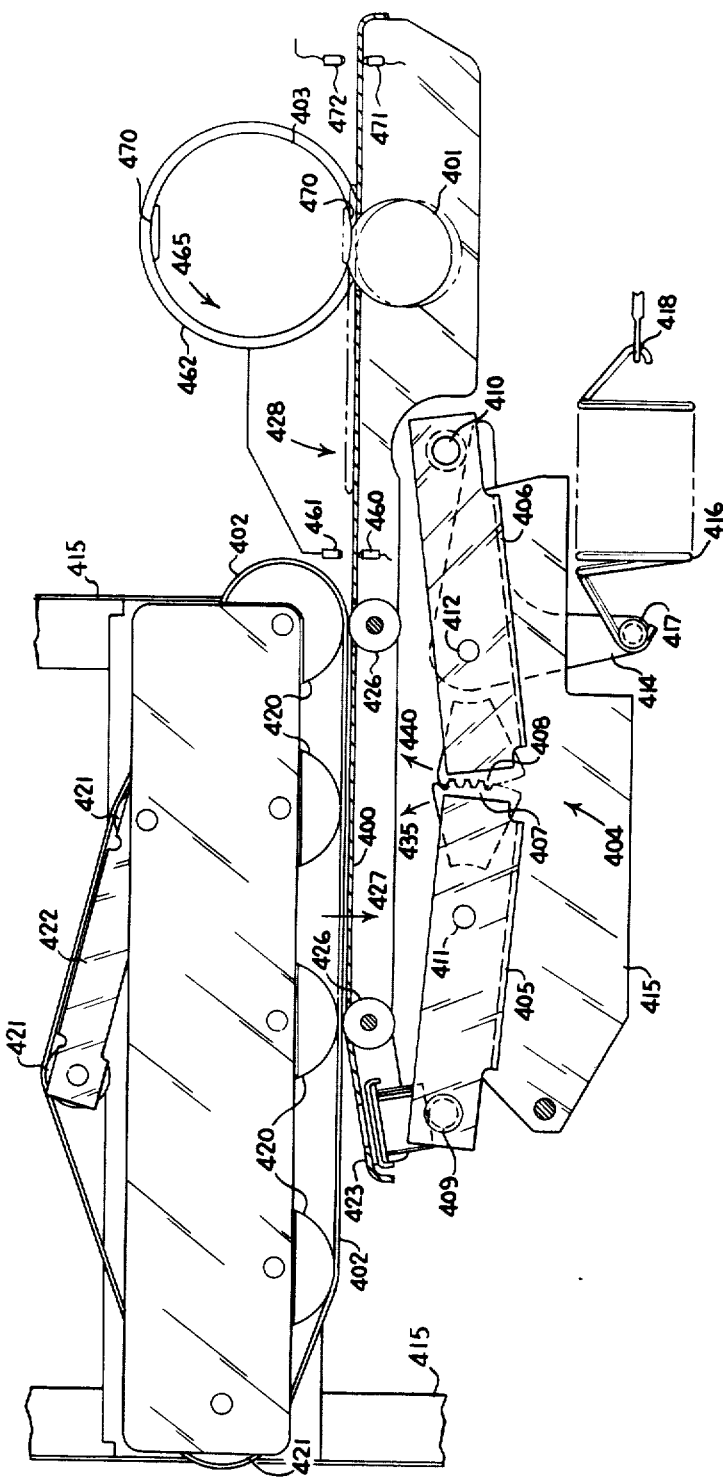
Figure 16:
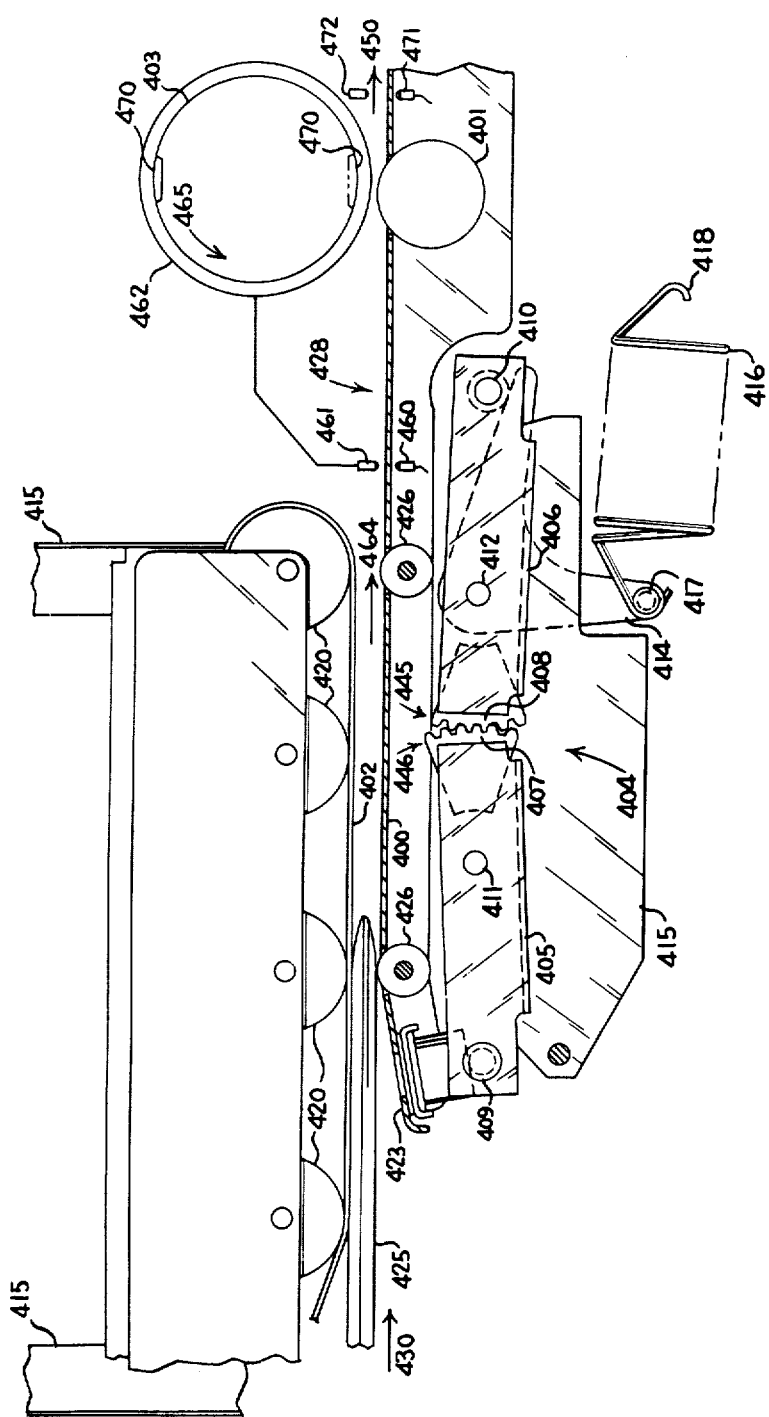
Figures 17, 18:
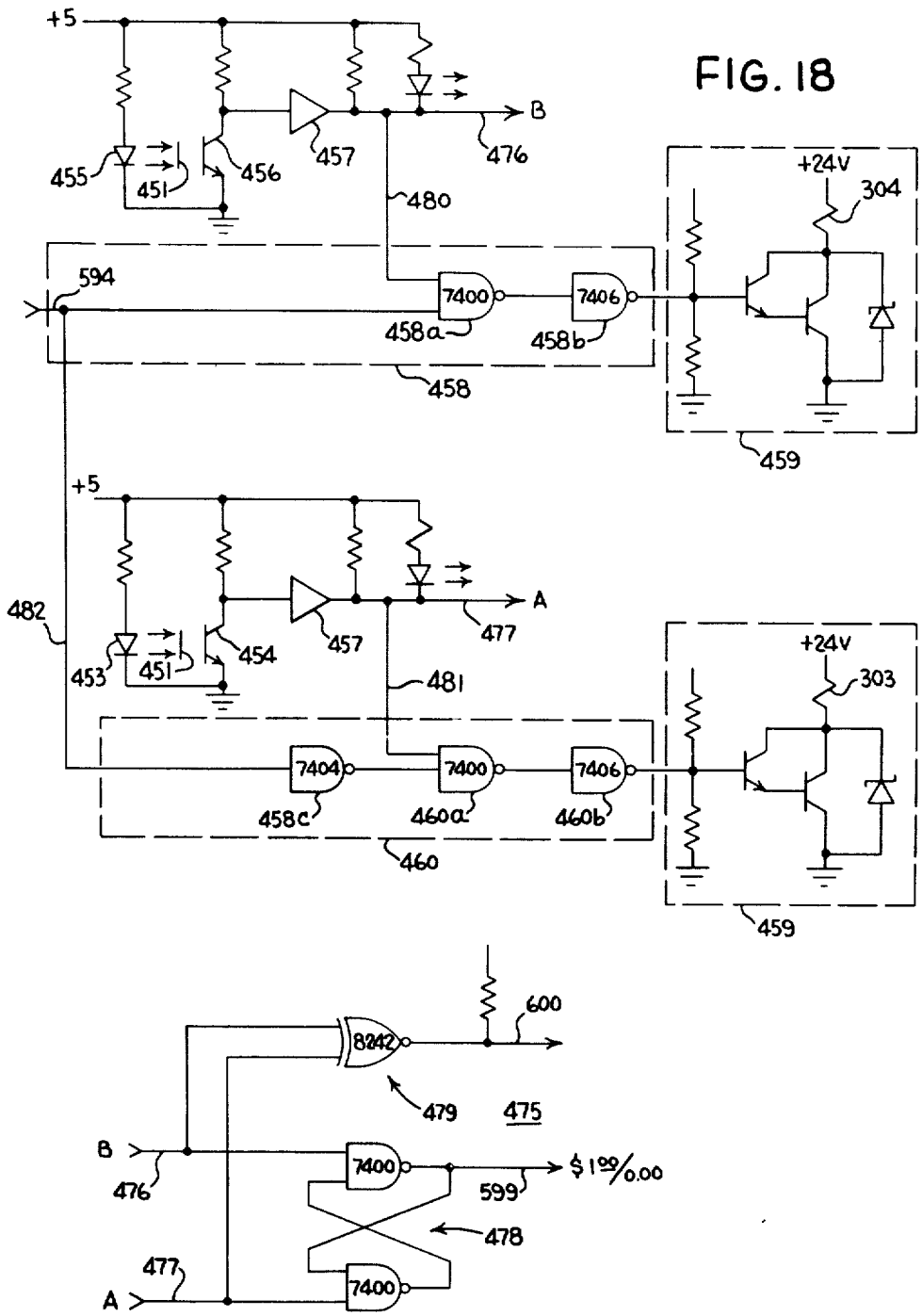

FIG. 5 is a perspective view of the camming mechanism for actuating the ejection rollers of FIGS. 2, and 3a through 3d, and the mechanism for actuating the stopping fingers of FIGS. 2, and 3a through 3d;

FIG. 6 is a timing diagram of the camming cycle for the camming mechanism of FIG. 5;

FIG. 7 is a perspective view of the meter setting mechanism for the meter at the postage meter station of the mixed mail handling system shown in FIG. 1;

FIGS. 7a and 7b are perspective views of the feed-back apparatus for the "dollar" setting solenoids of FIG. 7, FIGS. 7a and 7b showing alternate upper and lower positions, respectively;

FIG. 8 is a sectional view of the nested shafts of the setting mechanism of FIG. 7;

FIG. 9 is a perspective view of a structural deletion for the meter at the postage meter station of the mixed mail handling system shown in FIG. 1;

FIG. 10 is a perspective view of a modification of the lock-out mechanism for the meter at the postage meter station of the mixed mail handling system shown in FIG. 1;

FIGS. 11a through 11d are segments of an electrical diagram of the arithmetic logic and pulse generating circuitry operatively interconnecting the weighing station with the postage meter station of the mixed mail handling system of FIG. 1;

FIG. 11e is a block diagram illustrating how the FIGS. 11a through 11d fit together;

FIG. 12 is an electrical diagram of the buffer control circuitry operatively interconnected between the scale of the weighing station of FIG. 1, and the arithmetic logic and pulse generating circuitry of FIG. 10;

FIG. 13 is a timing diagram for the buffer control circuitry of FIG. 12;

FIG. 14 is a diagrammatic block diagram of the meter control and feedback system of the meter of the postage meter station of the mixed mail handling system shown in FIG. 1;

FIGS. 15 and 16 are top views of an imprinting deck mechanism for the meter of the postage meter station of the mixed mail handling system of FIG. 1, FIG. 15 depicting the imprinting deck in a home, or at rest position, and FIG. 16 illustrating the imprinting deck in an operative, envelope-receiving position;

FIG. 17 is an electrical diagram of the conditioning circuit shown in FIG. 14; and FIG. 18 is an electrical diagram of the pull and gating circuits shown in FIG. 14.

DETAILED DESCRIPTION OF THE DISCLOSURE

Generally speaking, the invention is for a continuous automatic weighing and metering mail handling system for processing a large volume of mixed mail. The system comprises means defining a continuous mail handling feed path wherein pieces of mail are transported with a substantially vertical orientation. A weighing station is disposed along said feed path and measures the weight of each piece of mail being delivered thereto. First automatic delivering means is provided for delivering in seriatim a plurality of individual pieces of mail along said feed path to the weighing station. A postage meter station is disposed along said feed path for receiving weighed mail from the weighing station. The postage meter station imprints postage upon the mail in accordance with the amount of postage determined to be necessary by said weight measurement. A second automatic delivering means is provided for delivering weighed pieces of mail in seriatim along said path to the postage meter station. Control means operatively interconnected between the weighing station and the postage meter station insures that the imprinted postage amount of the postage meter station corresponds with the determined amount for each piece of mail.

The control means of the system is further characterized by means for turning each of the imprint wheels of the postage meter station in one of two direictions so as to choose the shortest incremental path between a previously set value and a new print value of postage.

The inventive system further comprises computational means operatively interconnected between the weighing station and the postage meter station. The computational means determines the required postage for each piece of mail being delivered to the postage meter station.

The invention still further comprises information synchronization means operatively interconnected between the weighing station and the control means for insuring that each piece of mail delivered to the postage meter station will be imprinted with the determined amount of postage for that individual piece of mail when it is delivered to the postage meter station.

The present invention is also characterized by traffic control means for synchronizing the flow of mail along the feed path such that at any one instant a multiplicity of pieces of mail will be in transit at different stations along the feed path.

Figure 1A:
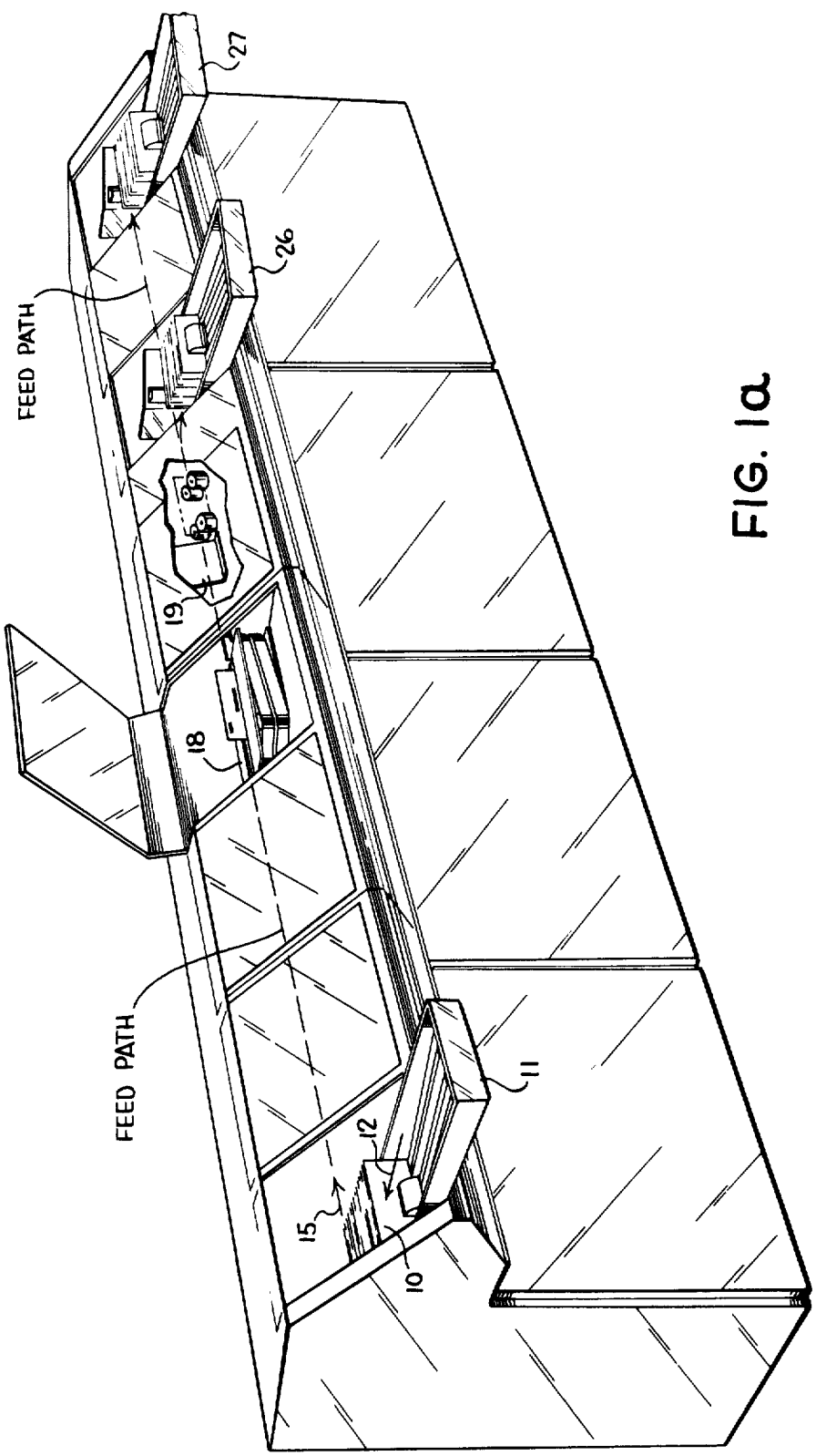
FIG. 1a is a perspective view of the mail handling system of FIG. 1.

Now referring to FIGS. 1 and 1a, a schematic and perspective view of the inventive mail handling system is shown. A stack 10 of mixed mail is deposited upon a feeder deck 11. The feeder deck 11 advances the stack 10 towards a feeder drive mechanism 13 as shown by arrow 12. The feeder drive mechanism feeds the mail along a feed path transversely to that of the deck feed direction 12 as shown by arrow 15. As the mail is fed into the system by the feeder drive 13, it is separated for one-at-a-time feeding by separator 14. The separated letters then proceed in seriatim along said feed path to a pre-seal transfer station 16, a sealer station 17, and a pre-scale transfer station 18. The pre-seal transfer station 16 and the pre-scale transfer station 18 are interim mail holding stations, which allow for a synchronized traffic pattern to be developed along the feed path. The sealer station 17 wets the flaps of unsealed envelopes, and then the flaps are smoothed down to provide a seal. (Refer to copending applications Ser. No. 452,676 filed Mar. 20, 1974; Ser. No. 459,037 filed Apr. 8, 1974 and Ser. No. 459,031 filed Apr. 8, 1974).

From the pre-scale transfer station 18, the letters are deposited in seriatim upon a scale 19, which forms part of the weighing station 20. When each letter is weighed at said weighing station, a determination is made of the required postage necessary for that particular envelope. This postage information is used to control the settings of a postage meter 24 subsequently disposed at a postage meter station 28 along said feed path. This information is synchronously controlled so that when a particular letter reaches the postage meter station 28, the meter 24 will be properly set to correspond to the postage amount determined for that particular piece of mail. In addition to having the information synchronized, the flow of mail must be synchronized between the weighing station 20 and the postage meter station 28, as well as all along the feed path from the feeder deck 11 to the metered mail stacker 27. This mail flow synchronization provides a traffic control pattern, which allows for a multiplicity of letters to be in transit along the feed path at any instant of time.

After a letter is weighed at the weighing station, it is ejected from the scale 19 and enters a post-scale transfer station 21. From the transfer station 21, the letter enters a selector station 25, which contains a control gate 22. When the weighing station determines that a letter is over-weight (more than 8 oz.) the gate 22 is directed to close causing an arriving letter to be rejected into a reject stacker 26. When a letter arriving at the selector station 25 is within the proper weight range to be metered, the gate 22 remains open. In the open condition, the gate 22 allows the letters to pass on to the postage meter station 28 via a meter transfer station 23. Upon entering the postage meter station 28, a letter is imprinted with the proper postage, and is then deposited into a metered mail stacker 27.

The operation of the system is such, that a large volume of mixed mail is continuously moved along the feed path. Unsealed envelopes are sealed. Over-weight envelopes are rejected and separately stacked. Letters within the proper weight range are weighed and automatically imprinted with the required postage based upon the weight measurement. Bulk mail may be run through the system without having to weigh and meter the letters. Thus, a completely automatic mail handling system is provided.

Figure 2:
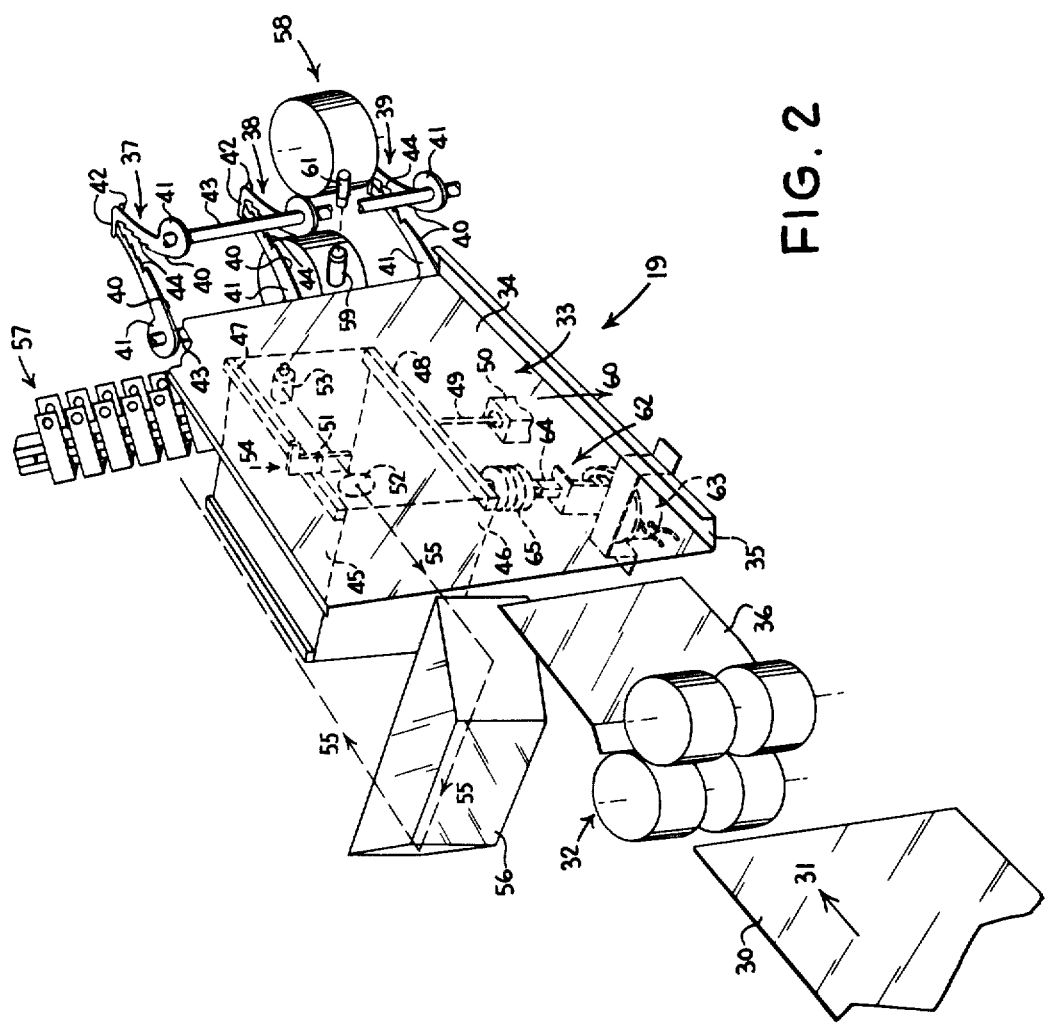
FIG. 2 is a perspective view of the weighing apparatus at the weighing station of the mixed mail handling system shown in FIG. 1.

FIG. 2 shows the apparatus for the weighing station 20 of FIG. 1. A letter 30 is depicted moving edgewise along the mail feed path of the system (arrow 31). The envelope 30 is approaching two pairs of feed rollers 32 of the pre-scale transfer station 18. When the scale 19 is in the process of weighing a letter, the incoming letter 30 is held in check at the feed rollers 32. When the foregoing letter is weighed and passed on from the weighing station, the feed rollers 32 transfer the subsequent letter 30 to the scale 19. The letter 30 is deposited upon a weighing tray 33 of the scale 19. Tray 33 is tilted backward, so that the letter rests upon the vertical wall 34 of the tray, when the letter is deposited thereon. The tray 33 also contains a trough 35 at its lower end for supporting the edge of the letter 30. A baffle 36 is positioned ahead of the feed rollers 32 to properly guide the letters upon tray 33.

As a letter is fed to tray 33, it is given a certain forward velocity. Therefore, there is a need for means to stop the forward movement of the letter, so that it will be deposited upon the tray 33. The stopping means consists of three pairs of fingers 37, 38 and 39 respectively, arranged in a tier, and positioned behind the tray. The pairs of fingers 37, 38 and 39 are each respectively spring-loaded to a normally closed position as shown. Each arm 41 of the fingers 37, 38 and 39 has an involute surface 40, which curves inwardly. The two inwardly curving surfaces 40 tend to present a progressively narrowing stopping area, which acts to decelerate an incoming letter. These curved surfaces 40, also are designed to accommodate different thicknesses of mail. Each of the decelerating arms 41 of finger pairs 37, 38 and 39 have a digit 42 at the end thereof. The digits 42 extend at right angles to the arms 41 of each pair of fingers 37, 38 and 39, so as to overlap each other, and act as a complete brake for an incoming letter. Each arm 41 is keyed to the other arms 41 of the sets of fingers by means of a shaft 43. This provides that all three sets of fingers act in unison, when opening and closing. Each involute surface 40, further contains hook-like projections or teeth 44, which act to trap an incoming letter in such a way, that the letter will not bounce or back-out from between the arms 41. The sets of fingers 37, 38 and 39 are staged at different levels to provide stopping means for different heights and sizes of letters. A small letter may not be trapped by the set of fingers 37, for example, but will be stopped by finger pairs 38 and 39.

After an incoming letter is stopped by the pairs of fingers, the fingers are made to separate, thus depositing the letter upon the weighing tray 33. The weighing scale 19 has two leaf springs 45 and 46, respectively, which are attached to the wall 34 of tray 33 along their edges 47 and 48, respectively. The other end of the leaf springs are anchored to the frame of the scale. After a letter is deposited in the trough 35 of the tray 33, the tray 33 is caused to deflect downwardly (arrow 60) against the force of the springs 45 and 46. When the deposited letter is removed from the trough 35, the leaf springs 45 and 46 act to restore the tray 33 to its original undeflected position.

A push rod 49 attached to the leaf spring 46 projects down into a dashpot 50. The lower end of the push rod 49 is attached to a tapered piston (not shown) of the dashpot device. The dashpot acts to dampen oscillations which may occur when the tray deflects. The tray 33 must be damped in order that an accurate weight reading may be obtained within a given time range compatible with the speed of the system in processing the mail. The dashpot 50 is of the variable-orifice type, wherein the damping becomes greater as the deflection of the tray increases. This type of variable damping has been found necessary with the leaf spring scale, since oscillations tend to increase in proportion to the amount of deflection of the scale.

An optical read-out is provided for measuring the deflection of the tray 33.

Weight of a letter depresses the tray 33 in a downwardly direction as shown by arrow 60. When the tray 33 is depressed, a shutter-arm 51 attached to wall 34 of the tray 33 moves past (arrow 54) a light window 52 containing a focusing lens. When the shutter-arm 51 moves past window 52, the light source 53 is partially or completely blocked. Light is prevented from being transmitted through the window 32. The light passing through the window 52 follows a light path illustrated by arrows by arrows 55. Light passing through the window 52 is reflected by prism 56, and is made to fall upon a bank of photodetectors 57. When the shutter-arm 51 is caused to cover the light window 52, the light which normally floods detectors 57 is blocked, causing the detectors to fall into shadow. As the tray 33 increasingly deflects downwards under the weight of a letter, the photodetectors will progressively be deprived of light. Shutter arm 51 will deflect a given amount dependent upon the weight of a piece of mail, and the photo-bank 57 will detect the amoun of deflection, and hence, the weight of the letter.

A zero-adjust device 62 shown in greater detail in FIG. 2a insures that the scale 19 is always set at the same initial zero position despite possible dust accumulations within the trough 35. The zero-adjust mechanism 62 comprises a motor and worm drive 64 which acts upon an adjustable spring 65. The spring 65 is attached to tray 33 via bracket 66, so that every time the worm 64 is moved, the tray 33 will be returned to a home or zero position. The deviation of the tray 33 from its home position is sensed, when the first photodetector 90 (FIG. 2b) of the bank of detectors 57 is bathed in darkness due to a downward movement (arrows 92) of the shadow line 91 induced by the downward movement (arrow 60) of the tray 33 and shutter arm 51 (arrow 54). When the first detector is bathed in shadow, the motor 63 is activated to operate the worm mechanism 64 until the tray 33 and shutter arm 51 move upwardly enough to allow light to reach the first photodetector. Thus, a definite zero or home position is automatically maintained. The spring rate of coil spring 65 is a fraction (1/20th) that of the combined spring rate of leaf springs 45 and 46, thus providing a very sensitive and accurate adjustment for the zero position.

The bank of photodetectors 57 as shown in FIG. 2b, has a unique screw adjustment 93. This adjustment insures that despite differences in spring rates of springs 45 and 46, (FIGS. 2 and 2a) which may be due to manufacturing tolerances, the weight of a piece of mail will always be accurately sensed by detectors 57.

The detectors 57 are mounted upon a movable arm 95, which is pivotable (arrows 96) about pivot pin 94. When the screw 93 is turned, the bank of detectors 57 pivot (arrow 96) as a slide pin 97 attached to turnbuckle 99 and detector arm 95, is caused to move in arcuate slot 98. The pivotable movement of the detector arm 95 causes the vertical distance $d$ to change between each of the detectors in the bank 57. This change in the vertical distance compensates for changes in the leaf spring rate, which directly effects the distance the shadow line 91 will travel per ounce of mail. Thus, the change in the distance $d$ will offset any manufacturing or tolerance differences in springs 45 and 46.

While there is cogent reasons for providing a vertical orientation to the weighing tray 33 and the mail handling feed path of this system on the basis of the ability to handle a large volume of mail faster and more easily than that provided by a horizontally oriented weighing tray and feed path, the vertical orientation of the weighing tray 33 itself provides two extraordinary advantages to the system:

a. When an envelope lands upon tray 33, it lands upon its edge. The edge of the envelope presents the stiffest profile to the weighing system, and reduces the external vibration introduced into the system by the letter. That this is an important advantage can readily be appreciated, when one considers that the extreme speed and accuracy of the system is highly dependent upon the proper damping of the weighing scale. Thus, externally applied or influenced vibrations which influence this damping, should be kept to an absolute minimum. The vertical orientation of the envelope and the weighing tray 33 is, therefore, a technically important feature; and b. The vertical orientation of the weighing tray 33 also provides the vertically disposed envelope resting therein, with an extremely narrow weighing corridor. This is most important from an accuracy standpoint, since the envelope always comes to rest very close to the center of gravity of the weighing tray. This prevents inaccuracies introduced into the weighing measurements by potentially harmful weighing moments.

After a weight reading is made, ejector rollers 58 are brought closer together, thus pinching the letter and ejecting it from the weighing station. A light source 61 and photocell 59 detect when the letter is ejected from the weighing station.

The stopping, weighing and ejecting sequence can be more clearly understood with reference to FIGS. 3a through 3d.

Figure 3A:
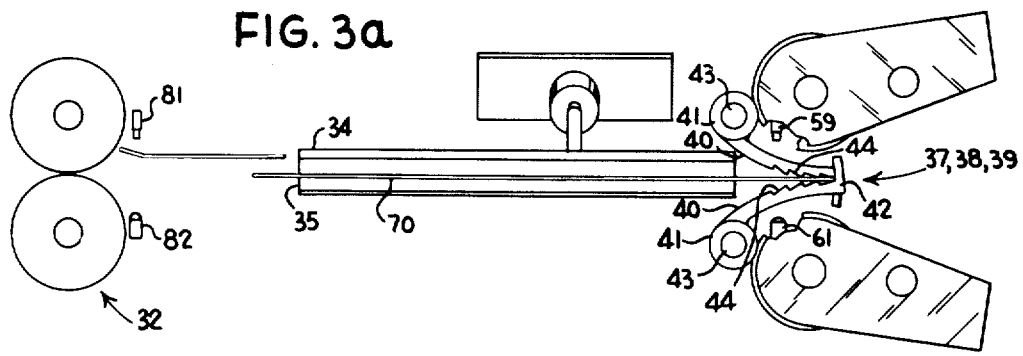
FIGS. 3a through 3d are top views of the stopping and ejecting mechanism of the weighing apparatus of FIG. 2, illustrating the mechanical sequence for stopping, weighing, and ejecting a piece of mail at the weighing station.
Figure 3B:
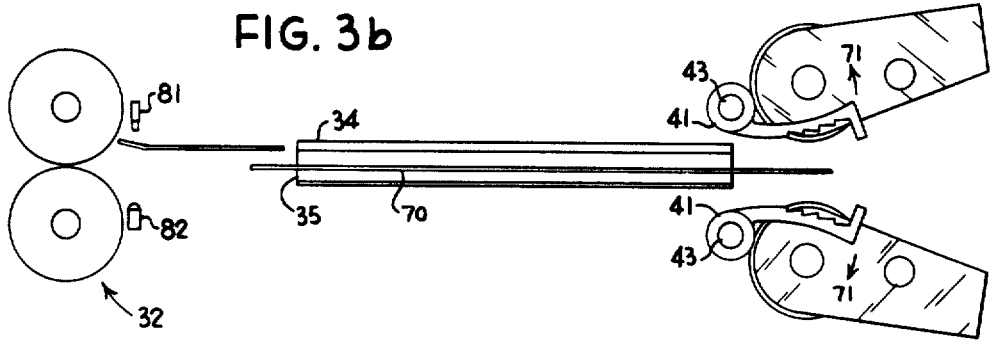

FIG. 3a depicts a piece of mail 70 which has been fed to the stopping fingers 37, 38 and 39. The letter comes to rest against digits 42, which block the passage of the letter. The letter is held in place by involute surfaces 40 of the arms 41, and the saw-toothed projections 44.

Figure 3C:
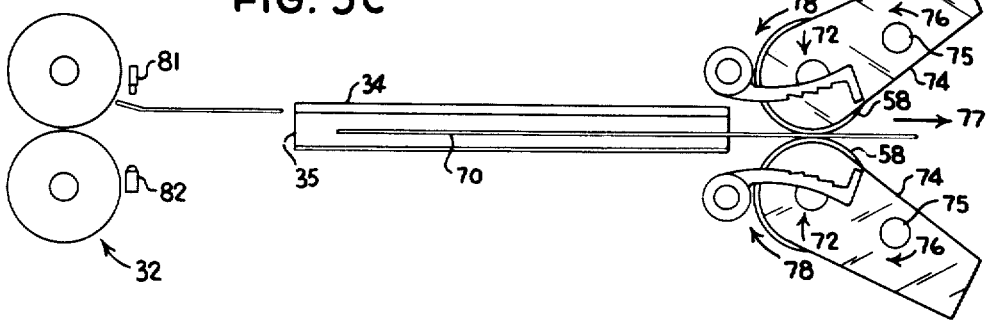
Figure 3D:
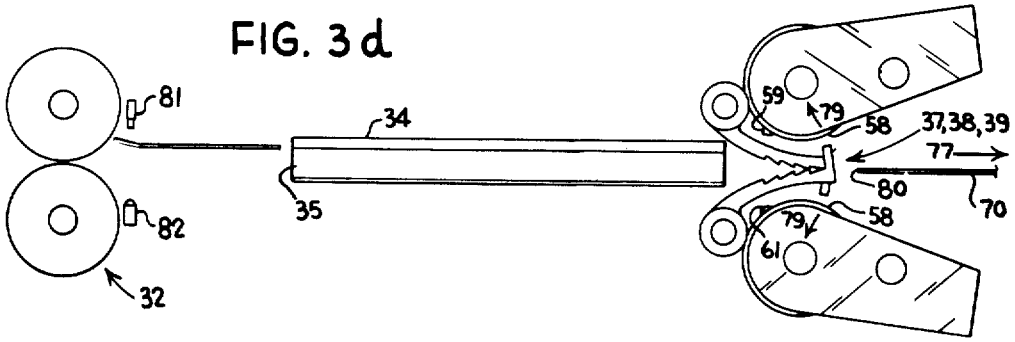

When the letter 70 enters the stopping fingers 37, 38 and 39, the light beam from the light source 61 is broken to the detector 59. When the detector 59 no longer sees the light beam, it activates a solenoid 241 (FIG. 5) to rotate shafts 43, causing the pairs of stopping fingers 37, 38 and 39 to separate as shown by arrows 71 in FIG. 3b. When the fingers separate, the piece of mail 70 is deposited upon the tray 33 for weighing purposes. After the letter 70 has been weighed in FIG. 3b, the ejection rollers 58 come together as shown by arrows 72 in FIG. 3c. The ejection rollers 58 are each rotatively supported upon jaws 74. The lever-arms 74 are rotatively turned toward each other (arrow 72) by means of a camming mechanism 73 shown in FIG. 5. The camming mechanism 73 is activated by the breaking of the light beam to detector 59 in FIG. 3a. The camming mechanism 73 is operatively connected to lever-arms 74 by means of shafts 75 (FIG. 3c). The camming mechanism causes shafts 75 to turn, (arrows 76) which results in bringing jaws 74 and rollers 58 together (arrows 72). The ejection rollers 58 pinch the letter 70 between themselves, and eject the letter from the scale as shown by arrow 77 as they rotate (arrows 78).

When the letter 70 has been ejected from the scale, the lever-arms 74 carrying rollers 58 are caused to move apart as depicted by arrows 79. Fingers 37, 38 and 39 are closed to stop a subsequent letter transferred to the scale by rollers 32. The fingers 37, 38 and 39 are closed in response to the photo-detector 59 receiving light from light source 61, when the trailing edge 80 of letter 70 moves past the detector 59.

The rollers 32 will not feed a letter to the scale until detector 59 receives light from source 61. The breaking of the light beam between light source 81 and photodetector 82 positioned adjacent the rollers 32, operates to sense the presence of an envelope at the pre-scale transfer station. This detection causes rollers 32 to rotate, so as to eject the letter to the weighing station, when detector 59 is receiving light.

FIG. 5 depicts the camming mechanism 73 for actuating the ejection rollers 58 of FIGS. 2 and 3a through 3d. FIG. 5 also illustrates the actuating mechanism for the stopping fingers 41 (decelerating device) of FIGS. 2 and 3a through 3d.

Rollers 58 of the ejection mechanism of FIGS. 2, 3a–3d, are continuously made to turn (arrows 78) by means of a belt drive (not shown). When an envelope is caught between these rotating rollers, as when the rollers are forced toward each other (arrows 76), the envelope will be ejected from the weighing station 20 of FIG. 1. The pinching of rollers 58 is achieved by rotating (arrow 212) eccentric cam 200 about its center shaft 201. Cam 200 is continually in contact with the wheel 202 due to the biasing of coil spring 206. Wheel 202 is free to turn (arrow 220) about shaft 203, which is journalled in the U-shaped bracket 204.

When the eccentric portion of the cam moves against wheel 202, it causes the wheel 202 to move backwards as indicated by arrow 213. Because the wheel 202 is journalled in bracket 204, the bracket 204 is caused to pivot (arrow 214) about shaft 211, against the biasing of spring 206 which is anchored against movement in bracket 205.

When the U-shaped bracket 204 is caused to pivot, it pushes against pin 207 which is affixed to shaft 208. This causes shaft 18 to move backwards as depicted by arrow 216.

A bracket 209 secured to the end of shaft 208 is similarly made to move backwards as the shaft moves backwards.

The bracket 209 carries two pins 210, which push against pivot arms 223 and 224, respectively, as the bracket 209 moves. Two vertically extending shafts 75 are respectively keyed to pivot arms 223 and 224, and are rotationally anchored in frame 270.

When the pins 210 push against pivot arms 223 and 224, shafts 75 are caused to rotate as illustrated by arrows 76.

Rollers 58 are each rotationally supported by jaws 74, which are keyed to the vertical shafts 75, respectively. As the shafts are caused to rotate (arrow 76), the jaws which are keyed to the shafts are caused to move the rollers towards each other as shown by arrows 72.

As the rotation of cam 200 rotates past its highest eccentric position, the bracket 204 will pivot opposite to rotational direction 214, under the influence of coil spring 206. This in turn, will move shaft 208 and bracket 209 forward (opposite in direction to arrow 216), causing shafts 75 to rotate opposite to rotational direction 76. This will result in separating the pinch rollers 58.

The tier arrangement of stopping fingers 37, 38 and 39 are operated between an open and closed position by means of a solenoid 241. The stopping fingers are comprised of two arms 41 as aforementioned, which are each keyed to rotatable shafts 43, respectively. Each shaft 43 is free to rotate (arrows 260 and 261, respectively) in slot 256 of push rod 242, which is secured to the solenoid push rod 244 by pin 243.

Each shaft 43 carries a disc 250 which is pinned to rod 242 by a pin 251. The rod 242 is baised by a spring (not shown) towards the solenoid 241.

When the solenoid 241 is energized, is pushed against its push rod 244, causing rod 242 to move. When the solenoid is de-energized, the rod 242 will move against its biasing force back to a home position.

The reciprocal movement (arrows 240) of the push rod 242, will alternately open and close the fingers 37, 38 and 39, because shafts 43 will be made to alternately turn inwardly and outwardly towards each other. This is accomplished by pins 251 which engage suitable laterally extending slots (not shown) formed in the rod 242, and which in turn cause disc 250 and shafts 43 to rotate. The movement of the pins 251 will cause an opposite rotation in shafts 43, because they are each secured to an opposite side of push rod 242 as shown. Thus, the arms 41 will be caused to open and close with the reciprocal motion of the push rod 242.

FIG. 4 is a timing chart showing the sequence of events of handling mixed mail from the pre-scale transfer station 18 through the post-scale transfer station 21. It will be readily appreciated that various sizes and weights of letters will create difficulties in sequencing of the various mail handling operations. Therefore, with mixed mail it is not easy to provide a smooth flow of mail through the system.

For example, differences in the weight of letters may require that some envelopes spend more time being weighed than other pieces of mail. Points of support and detection in the transfer stations must be adequate to accomodate different lengths of mail, so that small letters will not "float" between transfer rollers or that two letters will occupy the same station at one time. Thicker letters must not cause jamming, and the sequence of weighing and ejecting must be uniform despite variations in the length of the envelopes. Even the height of the letters must be considered when vertically spacing the stopping fingers 37, 38 and 39.

The present invention provides that all pieces of mail irregardless of their weight, be afforded the same weighing time needed for the heaviest letter to fully deflect the scale 19. This weighing time has been calculated to be .305 seconds in order to provide a ½ second delay at the weighing station. The weighing operation is commenced at 0.025 seconds after detector 59 of FIG. 2 senses the breaking of the light beam by a letter which is stopped by fingers 37, 38 and 39. Between the initial breaking of the light beam to detector 59 and at the start of weighing, (0.025 seconds) the fingers 37, 38 and 39 support the piece of mail.

At the start of the weighing operation, the fingers are timed to release the letter, so that it falls upon tray 33 (FIG. 2).

The breaking of the beam to photodetector 59 serves several interdependent functions:
a. initiates the finger release and weighing operation;
b. initiates the camming device of FIG. 5 to operate the post-scale transfer ejection rollers 58;
c. prevents the pre-scale transfer of another envelope to the scale 19 by pre-scale transfer rollers 32, when a letter is still in the weighing station area; and
d. initiates information transfer from scale 19 to the logic and pulse circuitry of FIGs. 11a–11d.

The end of the weighing operation (0.330 seconds) and the maximum eject time for a ½ inch thick letter (maximum thickness) are coincident. The thinnest envelopes are ejected at 0.380 seconds (0.050 seconds later). A 13 inch letter (maximum length) will reinstitute the light beam at 0.420 seconds as the trailing edge of the envelope moves past detector 59. Thirty thousandths (0.303) of a second is alloted to close the stopping fingers, so as to receive a new incoming letter from the prer-scale transfer station. At 0.470 seconds, the incoming envelope breaks the light beam to photodetector 59.

Therefore, it is seen that the initial time of transferring, stopping, weighing, and ejecting a letter through stations 18, 20 and 21, is achieved in approximately 0.5 seconds. This time is required in order to process approximately 7,000 pieces of mail an hour, which is the deisgned mail handling speed of this system.

While the breaking of the light beam to detector 59 initiates the ejection process at time zero, there is a built in delay. Part of this delay is due to the rise time of the cam 200 of the ejecting mechanism shown in FIG. 5. The cam 200 has an 8° rise as shown in FIG. 6. At the top of the rise, the ejector rollers 58 will drive the thinnest envelope. The thickest letters will be driven at approximately one-half of the rise as shown in FIG. 6.

A subsequent incoming envelope will break the beam to detector 59 at 0.470 seconds, at which time the cam 200 has almost finished its downward decline (200 ml seconds). The cam is signalled to cycle again at this point in time. Thus, another part of the delay between initiation at post-scale ejection is provided in the time required for the cam 200 to complete its previous envelope cycle while the initiation of the new envelope camming cyle is taking place.

The meter 24 at postage meter station 23 in FIG. 1, is a modified postage meter Model 5318, manufactured by Pitney-Bowes, Inc., Stamford, Connecticut, the present assignee of this invention. Unless indicated to the contrary, the inventive meter 24 is of similar construction, and functions in the same manner as a standard Model 5318 meter. The Model 5318 meter contains settings for cents, tens, and dollars operative to a maximum of $9.99 of imprinted postage.

Meter 24 of the invention has been modified to be automatically set to a maximum imprinted postage of $1.99 by means of a pair of stepper motors 301 and 302, respectively, and solenoids 303 and 304 as shown in FIG. 7. The stepper motors 301 and 302, and the solenoids 303 and 304 are arranged to control the appropriate meter setting actuators, one of which is shown in FIG. 7 as element 305.

Normally, the actuators (Part Nos. 5380752) are set manually by means of levers (Part Nos. 5351242) one of which is shown in phantom as element 306. In the modified meter 24 of this invention, the levers 306 have been removed to provide for automatic setting (hence, element 306 is shown in phantom in FIG. 7).

The modified meter of the instant invention only requires a maximum postage setting of $1.99, since the system is set to only imprint postage on mail weighing 8 ounces or less. All letters weighing more than 8 ounces are rejected from the feed path prior to metering, and are deposited in stacker 26 as aforementioned.

Stepper motor 301 and 302 individually control the cents, and tens actuators in a setting range from 0 to 9, respectively, as indicated in FIG. 8. The solenoids 303 and 304 control the dollar actuator to a reading of either 0 or 1.

The actuators 305 are controlled by the stepper motors and solenoids through three shafts 307, 308 and 309, respectively, which are nested one within the other as shown in FIGS. 7 and 8.

Solenoids 303 and 304 are each pivotably pinned to extension links 310 and 311, via pins 303a and 304a, respectively. Each of the extension links 310 and 311 are alternately caused to be pulled (arrows 315 and 313, respectively) by the solenoids. Each of the respective extension links 310 and 311 are spring loaded against the downward urging of their solenoids by means of compression springs 312 and 314, respectively. Thus, when either of the links 310 and 311 are pulled, they immediately spring back to their original position. This linkage arrangement allows that each link 310 and 311, respectively does not have to pull against the mass of the other link every time the meter is set to a different dollar position. Links 310 and 311 are movably pinned to gear 316 via slots 310a and 311a, respectively. The alternate pulling of the links 310 and 311, causes gear 316 to incrementally turn in either a clockwise or counterclockwise direction (arrows 317). When gear 316 is caused to incrementally rotate, another contacting gear wheel 318 (FIGS. 7 and 8) is made to incrementally turn. Gear 318 is pinned to shaft 307, so that shaft 307 is likewise caused to turn an incremental distance in either a clockwise or counterclockwise direction when gears 316 and 318 rotate. The shaft 307 transmits its motion to gear 319 (FIGS. 7 and 8) pinned at its other end. The gear 319 imparts this incremental motion to dollar actuator 305 (FIG. 7) via an intermediate gear wheel 320. Thus, dollar actuator 305 is made to move (arrows 350) between a 0 or 1 position.

Stepper motor 302 controls the "tens" actuator 305 (not shown) by rotating shaft 308 (FIGS. 7 and 8). Stepper motor 302 caused its shaft 323 and a pinned gear wheel 321 to turn in either a clockwise or counterclockwise direction, as shown by arrows 322. Gear 324 rotates in response to the movement of gear wheel 321 via intermediary gear 325. Gear 324 is keyed to shaft 308 as shown in FIG. 8, so that shaft 308 is likewise made to turn. A gear 326 keyed to the far end of shaft 308 turns the "tens" actuator 305 (not shown) via intermediate gear 327.

Stepper motor 301 controls the "cents" actuator 305 (not shown) in similar fashion to the control of the "tens" actuator by stepper motor 302.

Stepper motor 301 turns gear wheel 328 which is keyed to shaft 329, in either a clockwise or counterclockwise direction as shown by arrows 330. A gear 331 is made to turn via intermediary gears 332 and 333, when gear wheel 328 is caused to turn. Gear 331 being keyed to shaft 309 (FIG. 8) rotates shaft 309, thus turning gear 334 keyed at the other end of shaft 309. The "cents" actuator 305 (not shown) assumes the motion of gear 334 via intermediary gear 335 (FIG. 8).

Thus, it has been shown, that a postage meter can be automatically controlled by means of stepper motors and solenoids to provide a postage amount in the sum of $1.99 maximum.

While present postal rates are such that air mail letters weighing eight ounces only require a postage of 88 cents ($0.11 per ounce), the dollar bank has been provided in this meter to account for future increases in the postal rates.

Each actuator 305 has a detent mechanism 336 which is pivoted about point 344 and biased by means of spring 338, so that its toothed end 337 bites into gear teeth 339 of the actuator. The detent 336 normally has an extension bar 340 (shown in phantom in FIG. 7). The bar 340 (tip of assembly, Part Nos. 5380308 & 5380313) has been removed in the present inventive meter, along with the locking bail assembly 345 (part Nos. 5380261 & 5310060) shown in FIG. 9. The locking bail assembly 345 comprises a bail 341 and a hinge pin 342. Normally, the extension bars 340 of each detent mechanism are depressed by the bail 341 in order to lock the actuators when a lack of funds is detected in the register. The locking bail 341 is controlled by a locking comb 360 of FIG. 10. When the locking comb pivots, (arrow 346) as when the teeth 351 drop into the "zero-position" slots 353 of counter wheels 352, the locking bail 341 is normally caused to depress against the extension bars 340. Thus, the actuators 305 are prevented from turning. The locking bail also normally actuates a shutter bar which additionally prevents the meter from being operated.

However, the present metering system has no need for the setting levers 306, the locking bail assembly 345, and the extension bar 340, since the meter is automatically controlled.

The out-of-funds locking operation of this invention is accomplished by electrical and mechanical means, as shown in FIG. 10. Instead of the comb 360 actuating the locking bail 341, a shutter plate 347 pivots (arrow 348) into the path of light beam 349, when the locking comb 360 pivots (arrow 346) to its out-of-funds position. The light beam 349 is now intercepted and is not reflected by means of prism 355, and is not detected in window 354. The absence of the light in window 354 causes the meter to shut down. This shutting down can be accomplished by any suitable light activated electrical switching means (not shown). Thus, the meter is electronically rendered inoperative when insufficient funds are present in the descending register (counter wheels 352).

The buffer control circuitry interconnecting the weighing scale 19, with the logic and pulse generating circuitry for controlling the postage meter 24 is shown in FIG. 12. Unless otherwise indicated herein, the lectrical logic elements illustrated in all the circuit drawings are 7400 series TTL (transistor-transistor logic) components, such as are available from Texas Instruments, Inc. The buffer control will also be explained with reference to the timing chart of FIG. 13.

Figure 11B:
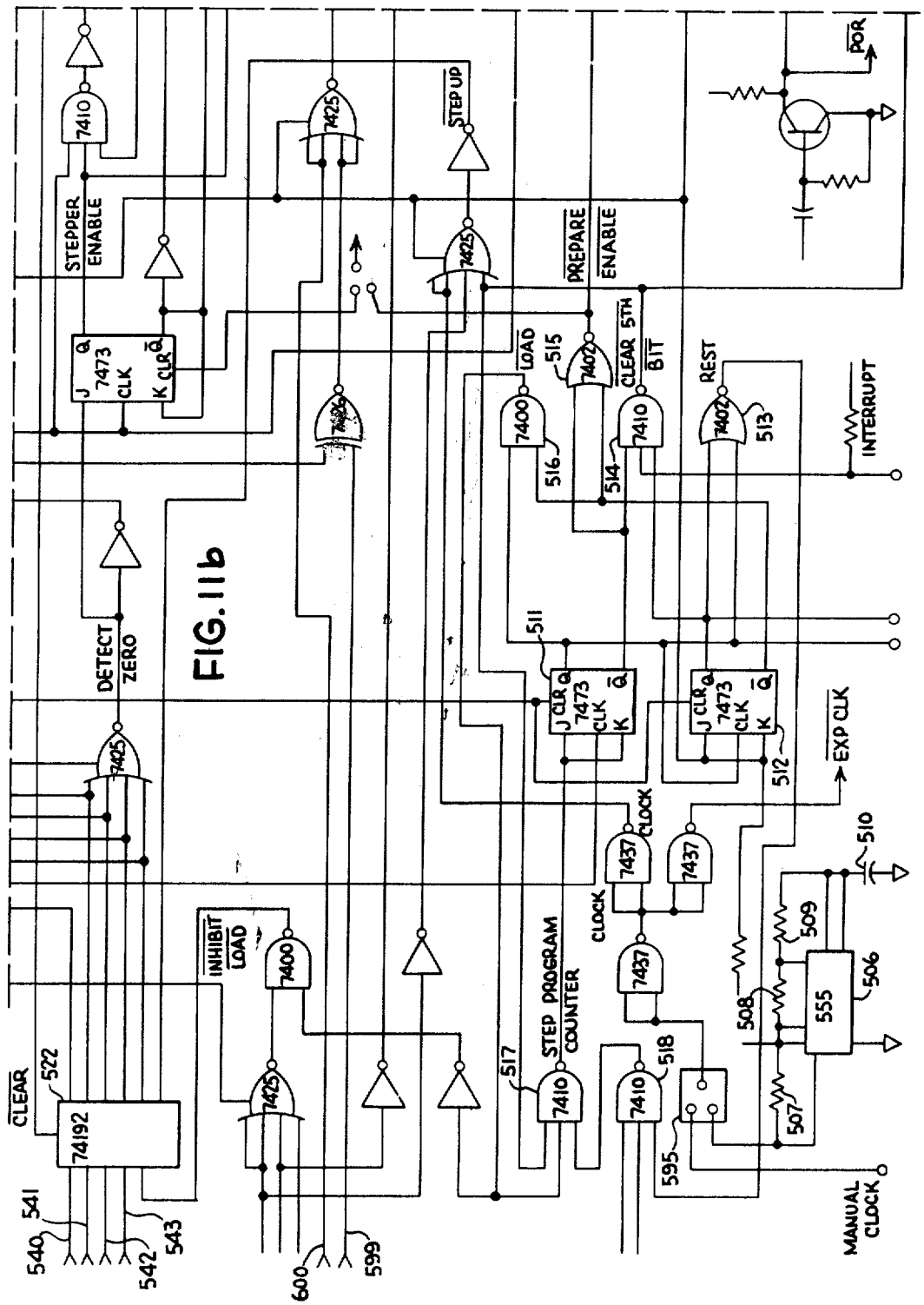
Figure 11D:
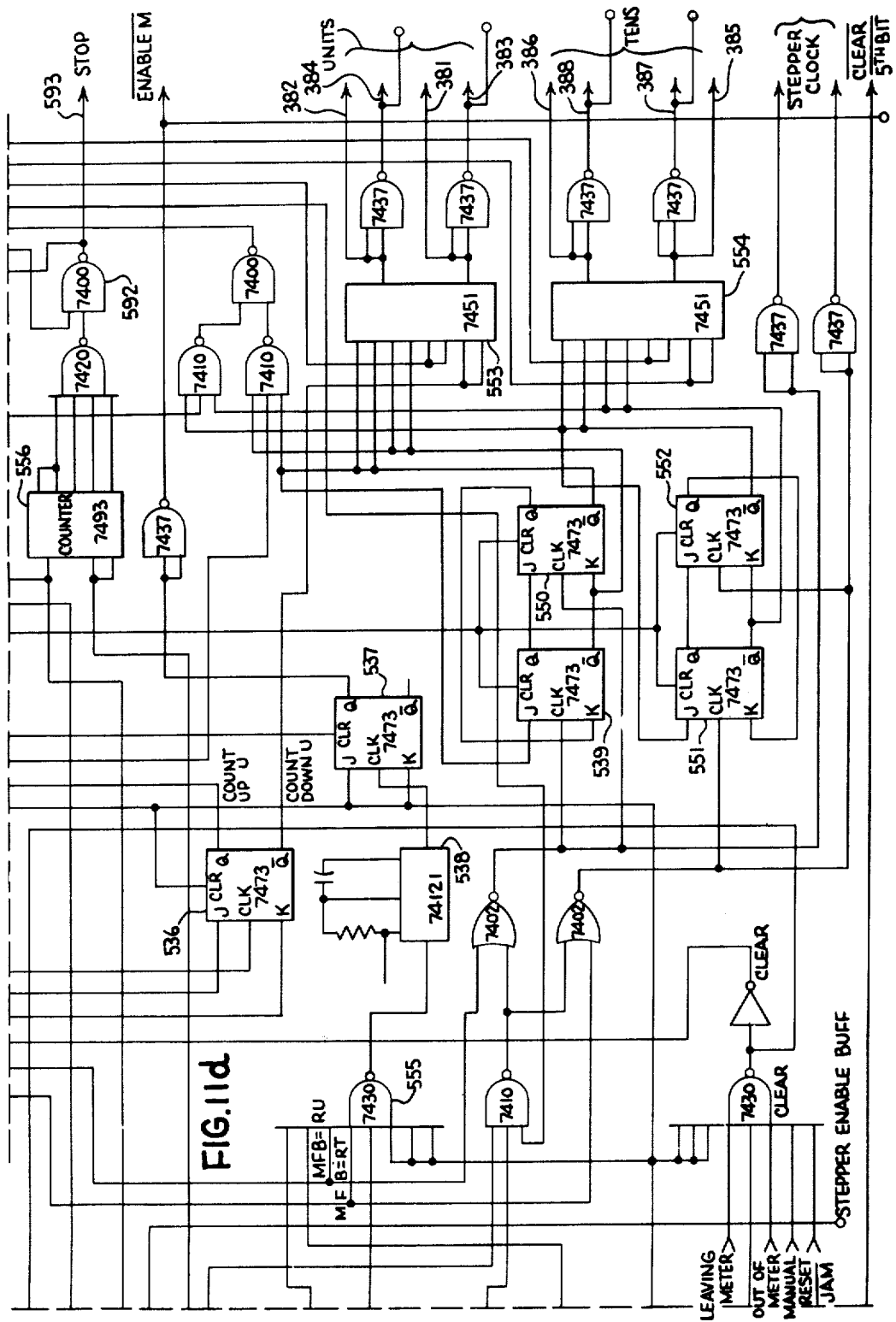

As the photodetector back 57 (FIG. 2b) of scale 19 is progressively bathed in shadow due to the deflection of weighing tray 33, the photodetectors 90 feed signals to the BCD encoders 500 and 500A of FIG. 12. The BCD encoders are ten line to four line priority encoders, wired together to provide BCD signals for 8 ounces maximum. One encoder could have sufficed, but the double combination allows for rewiring in the event a higher weight maximum is used. The encoders deliver a four bit BCD output corresponding to the weight signal (maximum reading) received from the photodetector bank 57. The BCD output from the encoders are transmitted to a first buffer (first in-first out register) 501 via lines 560, 561, 562 and 563 at clock pulse 1 (FIG. 13). A control flip flop 504 connected to buffer 501 receives a loading pulse on line 504A (fifth bit) to start the processing of the information, and will go high causing the buffer 501 to be loaded with the BCD information. At the second clock pulse, (FIG. 13) the information is loaded from buffer 501 into a second buffer 503, and a control flip flop 505 connected to buffer 503 is caused to go high when flip flop 504 is caused to go low. When buffer 501 transmits this information, flip flop 504 becomes low, so that the first buffer 501 can now be loaded with new information for a subsequent letter. Flip flop 504 will become high again causing buffer 501 to be loaded as shown in FIG. 12 at pulse three. At the end of pulse 5, buffer 503 transmits the information to the logic and pulse generating circuitry via lines 540, 541, 542 and 543, as shown in FIG. 11b. Flip flop 505 now becomes low. The first buffer 501 is now capable of loading the second buffer 503, and does so at the end of clock pulse 6. The control flip flop 504 now becomes low, and the flip flop 505 now becomes high. The load signal is provided by the one-shot 501A, which is initiated by the scale phototransistor 50 of FIG. 2.

The one-shot 501B provides a zero command to the motor 63 of the zero-adjustment mechanism 62 of FIGS. 2 and 2a. Whenever the scale is not weighing letters, the one-shot 501B activates the zero-adjustment mechanism 62. This assures that the zero-adjustment mechanism will not be continually cycling, but will be operative only between mail runs.

The clock controlling the buffer circuit of FIG. 12 is the same clock 506 shown in the logic and pulse generating circuit of FIGS. 11a-11d. The clock operates at a frequency of approximately 250 Hz. Although this pulse rate is not critical, it is obtained by means of clock 506 and the external resistors 507, 508 and 509, and capacitor 510, respectively.

The buffer circuit of FIG. 12 is required to maintain the information sequence for several letters traveling from the weighing station 20 to the postage meter 24. The need for buffering can be eliminated where only one letter at a time is caused to travel between the weighing station and the postage meter. This latter scheme is only possible, however, when the physical distance between the scale and the meter is short enough to allow the piece of mail to transit between stations 20 and 23, respectively, in ½ second or less. The ½ second requirement is necessary in order to maintain the design objective of processing approximately 7,000 pieces of mail per hour.

Naturally, when the distance between the scale and meter becomes too long, it then becomes necessary to have several letters enroute between stations 20 and 23, which results in the need for the buffer control of FIG. 12.

The logic and pulse generating circuit of FIGS. 11a-11d accepts the BCD code from the buffer 503 of FIG. 12, computes the required postage, and then generates the pulses to control stepper motors 301 and 302 (FIG. 7) consistent with the computed postage amount for the weight of the letter and the feedback information of the previous motor positions.

The logic and pulse generating circuitry operates in a sequential manner such that flip flops 511 and 512 control certain events according to a given order together with their associated gates 513, 514, 515, 516, 517 and 518, respectively.

The arithmetic unit of the logic circuitry comprises IC's 519, 520, 521, 522, 523, 524, 525, 526, 527 and 528, respectively. The arithmetic unit multiplies the unit price per ounce of mail times the ounces measured by the scale 19. This multiplication is really a series of additions which result in a computed postage, as will be further described, hereinafter.

Two comparators 529 and 530, respectively, compare the previous position of the "units" and "tens" actuator assemblies 305 (FIG. 7) with the computed amount of postage. The stepper motors 301 and 302 (FIG. 7), respectively are then supplied with pulses to adjust the actuator assemblies 305 to a new postage position. This adjustment is accomplished using the shortest rotational path, since the logic decides in which direction to move each stepper motor (clockwise or counterclockwise) to reach the new required postage position. Once coincidence is established between the meter settings and the computed postage amount, the meter is energized to print. The IC's controlling the pulse generation for the motors include the comparators 529 and 530, and components 531–539, and 550–555, respectively.

As aforementioned, the control flip flop 504 receives a fifth bit (load signal) from the one-shot 501A via the phototransistor 59, which initiates the processing of information. A control panel (not shown) allows the operator to select several different operations such as:
 a. check weight (display the weight measured by the scale on display panel);
 b. bulk rate (constant postage — no weighing or computing); and
 c. mixed mail metering (weighing and computing postage amount), etc.

A function such as "check weight" does not allow the fifth bit to be marked, and the processing of the weight information from scale 19 will not take place.

Once the weight information has reached the second buffer 503, and the fifth bit is marked, the Q output of J-K flip flops 511 and 512 go from a $F_{511}=0$; $F_{512}=0$ condition to $F_{511}=1$ and $F_{512}=0$ condition. This generates a load command to the up-down counter 522 which receives the BCD information from buffer 503 over lines 540, 541, 542 and 543.

Other control panel functions can prevent this load command, such as when the system is only being used to seal envelopes or when the date is being checked. When such conditions are present, the up-down counter 522 maintains a value (0000), and the load command is inhibited. The value (0000) is set into counter 522 at the "power-on" (POR) or "clear" signals from previous processed information.

With a next clock pulse, the Q output of the sequencing flip-flops 511 and 512 now step to a $F_{511}=0$, $F_{512}=1$ condition. This generates a "clear fifth bit" signal. If the system is set for bulk mail handling (constant postage), then counter 522 is stepped to a 1 value (0001). The three possible values for the up-down counter are as follows:

| | IC 522 | Reason |
|---|---|---|
| If seal-only or check-date | 0000 | No bookkeeping, zero × unit price = $0 |
| If constant postage | 0001 | Unit price = postage, 1 × unit price |
| None of the above | Scale Weight | Ounces × unit price = postage |

A subsequent clock pulse steps the sequencing flip flops to a $F_{511}=1$, $F_{512}=1$ condition. This removes the "clear" condition from J-K flip flop 535. This allows flip-flop 535 to be set when up-down counter 522 reaches zero. This indicates that a multiplication process has taken place. The setting of flip-flop 535 initiates the generation of the pulses necessary to step the stepper motors 301 and 302. This is carried out by components 539, 550, 551, 552, 553, 554 and 556, and their associated gates.

Once the sequencing flip-flops have attained the $F_{511}=1$, $F_{512}=1$ condition, they remain in this condition until they are cleared. The clearing condition will take place when the postage to be imprinted is committed to the postage meter 24. When the letter is detected leaving the meter, one cycle has taken place. The sequence of the flip-flops 511 and 512, and hence, the circuit sequence is repeated for a new cycle with the marking of the fifth bit.

When a value other than (0000) is loaded into the counter 522, the process of multiplication takes place. IC's 519 and 520 receive the "unit price per ounce" information over lines 570, 571, 572, 573 and 574, 575, 576, 577 corresponding to "units" and "tens" values. IC's 519 and 520 channel this four-bit information from a control panel setting. This setting will allow for adjustment from a "first-class" rate to an "air-mail" rate, or for an increase in mail rates, as will occur from time to time.

The steering flip-flop 521 allows the "units" and "tens" values of IC's 519 and 520 to be added through to four-bit adder 523 via lines 544, 545, 546 and 547. The information output of adder 523 is converted from binary form to BCD by converter 524. The BCD information is then loaded into the four-bit register 525, which transfers the information to four-bit register 526. Register 525 hold the information for "tens", and register 526 holds the information for the "units" value. Registers 525 and 526 are cleared at the end of the cycle when flip-flops 511 and 512 are returned to their zero condition.

Multiplication of the "unit price per ounce" (information in registers 525 and 526) is repeatedly added to itself for every ounce of weight measured for an envelope. The repeated additions are in effect a multiplication of the unit price times the weight. With every performed addition, the counter 522 is stepped down one time, until zero is reached. When the counter 522 reaches zero, the multiplication is completed. The following is an example of a typical multiplication operation:

correct answer. Because the counter 522 is now at zero, the addition operation is at an end. The J-K flip-flop 535 is now set, and the generation of stepping pulses for the stepping motors now takes place.

J-K flip-flops 539 and 550 control the generation of the "units" pulses. COmparator 529 compares the "units" resulting from the multiplication with the "units" fed back from stepper motor 301 via lines 580, 581, 582 and 583. If the "units" values are equal, the clock to flip-flops 539 and 550 is inhibited. If the values are not equal, then the flip-flops 539 and 550 begin to step through their code sequence. Gate 555 selects either the count-up or count-down code depending upon J-K flip-flop 536.

The result of the comparison of comparator 529 is loaded into J-K flip-flop 534 via line 578A, if the comparison is equal. When the postage "units" are either larger (count-down) or smaller (count-up) than the feedback "units", the result is loaded into flip-flop 536 via lines 588 and 589, respectively.

Loading is performed every time that the meter is at a defined position (not in between). The Q outputs of flip-flops 539 and 550 both equal 1, during this condition.

The "tens" comparator 530 loads J-K flip-flop 532 over lines 578 and 579, respectively when the comparison result is either greater or smaller than the meter setting. If the comparator resultant is equal, the J-K flip-flop 531 is loaded via line 590.

When both flip-flops 531 and 534 are set (indicating that "units" and "tens" are equal), a one-shot 538 generates a pulse which clocks J-K flip-flop 537. Flip-

|       |   Assume: | Weight<br>Unit price | = 2 ounces<br>= $0.16 |        |                |       |
|-------|-----------|------|-------------------------------------------|--------|----------------------------|-------|
| Adder | IC 522 | IC 521 | Output of IC 519<br>and IC 520 (Set 1<br>of Adder Inputs) | IC 521 | IC 526 (Set 2<br>of Adder Inputs) | Carry |
|       | 2 | 0 | 6 | 0 | 0 | 0 |
| 6+0   | 2 | 1 | 1 | 6 | 0 | 0 |
| 1+0   | 1 | 0 | 6 | 1 | 6 | 0 |
| 6+6   | 1 | 1 | 1 | 2 | 1 | 1 |
| 1+1+  | 0 | 0 | 6 | [3 | 2] | 0 |
| Carry |   |   |   | Answer |   |   |

The above example shows that initially, counter 522 has two stepping operations corresponding to the assumed weight of two ounces. The counter will count down once for each addition, or in other words, once for each ounce of weight.

The combined output of IC 519 and IC 520 provide the values for "units" and "tens", which in this case corresponds to the value 16 (1 and 6). J-K flip-flop 521 selects the "units" (Q=0) and "tens" (Q=1) for addition. During the first count down of counter 522, the value 6 is loaded into register 519, and is then transferred to register 520 as a 1 is loaded into register 520. In the next half count the 1 value in register 525 is transferred to register 526 as the addition of 6 + 6 produces a 2 value in register 525 with a 1 carry over. The final half count provides a shift of the 2 to register 526, and register 525 now receives the previous 1 from register 526, a 1 carry over, and an inputted 1 from IC 520 to give a resultant 3. Thus, the second count down results in a 32 in registers 525 and 526, which is the flop 537 supplies an enable signal to the meter.

If there should be a malfunction in the system, such that no coincidence is found with the meter feedback, then the system is de-energized and an alarm is sounded.

This is accomplished by means of counter 556, which has been counting how many times the stepper motors have been stepped, i.e., one count for every four steps ($F_{539}=1$, $F_{550}=1$, $F_{551}=1$, and $F_{552}=1$). We know that when the unit is operating correctly, the motor will require a maximum of ten pulses to reach a given position. An additional 5 pulses are allowed (total of 15 pulses) to pull the motor into synchronization. If at the end of 15 pulses, the motor has not reached the required position, then the system is shut down. This condition will remain until a reset switch is thrown.

The above error control may be better understood with reference to the following chart:

Assume that the required computed postage is 32 and the meter feedback is 24.

Postage     = 32

-continued

| | |
|---|---|
| E | = Equal |
| S | = Postage smaller than feedback |
| L | = Postage larger than Feedback |
| D | = Down |
| U | = Up |
| O | = Don't care |

Output of Comparator

| TC 529 | | IC 530 | | Meter Feedback | | FF 539 | FF 550 | FF 551 | FF 552 | Units S 1234 | Tens S 1234 | Error Counter |
|---|---|---|---|---|---|---|---|---|---|---|---|---|
| Units | Step | Tens | Step | Tens | Units | | | | | | | |
| S | D | L | U | 2 | 4 | 1 | 1 | 1 | 1 | 1100 | 1100 | 0 |
| O | D | O | U | O | O | 0 | 1 | 0 | 1 | 0110 | 1001 | 0 |
| O | D | O | U | O | O | 0 | 0 | 0 | 0 | 0011 | 0011 | 0 |
| O | D | O | U | O | O | 1 | 0 | 1 | 0 | 1001 | 0110 | 0 |
| S | D | E | Stop | 3 | 3 | 1 | 1 | 1 | 1 | 1100 | 1100 | 1 |
| O | D | E | Stop | O | O | 0 | 1 | 1 | 1 | 0110 | 1100 | 1 |
| O | D | E | Stop | O | O | 0 | 0 | 1 | 1 | 0011 | 1100 | 1 |
| O | D | E | Stop | O | O | 1 | 0 | 1 | 1 | 1001 | 1100 | 1 |
| E | Stop | E | Stop | 3 | 2 | 1 | 1 | 1 | 1 | 1100 | 1100 | 2 |

Counter 556 keeps track of the stepping, cycles, such that if equality has not been found by the time the counter has counted 15 pulses, the gates 591 and 592 are set to provide a stop signal on line 593.

Drivers have been provided at the clock of flip-flops 539, 550, 551 and 552, and also at count-up "units", and countup "tens". This provides the flexibility of controlling a stepper motor strictly by pulsing, rather than by using a code.

The dollar solenoids 303 and 304 of FIG. 7, are controlled via line 594 by J-K flip-flop 528 as shown.

The system may be manually clocked through switch 595, when trouble shooting is to be done.

The positions of the actuator assemblies 305 controlling the "units" and "tens" settings in the meter are monitored by coded disc assemblies 370 and 375, respectively, of FIG. 7. The "units" and "tens" positions are converted to electrically coded (BCD) signals, and then fed back to comparators 529 and 530, via lines 580, 581, 582, 583 and 584, 585, 586, 587, respectively, of FIGS. 11a–11d. The object of supplying this feedback, is to pulse the stepping motors 301 and 302 through the shortest rotational path for setting the actuator assemblies 305 from a previous value of postage (prior letter) to a new value of postage (subsequent letter). In other words, motors 301 and 302 are stepped in either a clockwise or a counterclockwise direction, whichever direction is shorter between the fixed end settings of 0 and 9. This meter setting system is designed to set the actuator assemblies from a minimum 0 setting to maximum 9 setting, or vice versa, in approximately 190 milliseconds. Of course, a shorter rotation, e.g., such as from a 3 setting to a 6 settin, will be accomplished in a shorter time.

The feedback of the positions of the actuator assemblies will be further explained with reference to FIG. 7 and FIG. 14. As aforementioned, the "units" and "tens" settings are monitored by BCD coded disc assemblies 370 and 375, which are respectively keyed to the stepper motor shafts 329 and 323 as shown in FIG. 7. The setting positions of the actuator assemblies 305 can be monitored in this way, since the stepper motors directly control these positions via rotation of their shafts 329 and 323. The stepper motor 301 controlling the "units" actuator, has a BCD coded wheel 371 keyed to its shaft 329. The BCD coded wheel 371 has ten different sets of apertures disposed therein, as generally shown by arrow 372.

The stepper motor 302 controlling the "tens" actuator, has a BCD coded wheel 373 keyed to this shaft 323. The coded wheel 373, likewise has ten different sets of apertures (arrow 374) disposed therein, which is only partially shown due to the cutaway of disc 373.

Each set of apertures 372 and 374, respectively, pertain to a different actuator setting from 0 through 9. The maximum number of apertures in each set of apertures for each disc is four, corresponding to the four bit BCD code which is electrically generated by each aperture (or lack thereof) in each aperture set.

These apertures allow light to pass through the discs 371 and 373, respectively. The light is generated for each disc 371 and 373 by means of a separate bank of four light emitting diodes (LEDS) 376 (shown only for coded wheel assembly 373 for the sake of brevity). The light generated by these LED's passes through a particular set of apertures pertaining to the rotational positions of the discs. The coded discs 371 and 373, respectively, rotate (arrows 377 and 378) with the rotation of the stepper motor shafts 329 and 323, to which they are respectively keyed. Thus, an individual disc position (particular aperture set) directly relates to the actuator assembly position.

A bank of four photodetectors 379 are positioned opposite the LED's 376, on the other side of the apertured disc as shown. These photodetectors sense the presence or absence of light generated by the LED's, dependent upon whether an aperture is present between them, in order to allow the light to pass through the disc.

The BCD signals from the photodetectors 379 for "units" and "tens", respectively are fed to their associated comparators 529 and 530 of FIGS. 11a–11d, via lines 580, 581, 582, 583 and 584, 585, 586, 587, respectively. The signals from the photo-detectors 379 are additionally conditioned by a schmitt trigger 390 to provide sharp pulses.

The stepper motor 301 controlling the "units" actuator assembly 305 is powered from a driving circuit 391 similar to that shown in FIG. 19 of the SLO-SYN Stepping Motors Catalogue MSM 1171, available from the Superior Electric Company, Bristol, Connecticut.

Similarly, the stepper motor 302 controlling the "tens" actuator assembly 305 is powered from a driving circuit 391.

The driving circuits 391 receive the stepping signals via gates 389 and lines 381, 382, 383, 384 and 385, 386, 387, 388, respectively of FIG. 14.

The actuation of the actuator assemblies 305 by stepper motors 301 and 302 set the print wheels 392 in the postage meter, and is recorded in the ascending and descending registers 393.

The position of the actuator assembly 305 controlling the "dollar" setting in the meter is monitored by disc assembly 450 shown in situ in FIG. 7, and in operational detail in FIGS. 7a and 7b. Disc assembly 450 comprises a disc 451 which assumes either a "dollar" or a "zero" position (arrows 317), i.e. the disc 451 will assume either an upper position (FIG. 7a) or a lower position (FIG. 7b).

A slot 452 disposed in the disc 451, likewise assumes an upper or a lower position with the displacement of the disc. In the lower position (FIG. 7b) the slot 452 is disposed between a first pair of detection elements consisting of a light emitting diode (LED) 453, and a photodetector 454 as shown. When the disc 451 is in this position, the slot 452 acts as a light passage between the LED 453 and the photodetector 454.

In the upper position, (FIG. 7a) the slot 452 is disposed between a second pair of detection elements consisting of LED 455 and photodetector 456. The slot acts as a light window between elements 455 and 456 in the upper position.

The light detected by either photodetector 454 or 456, respectively, is converted to an electrical signal which is fed back to the logic and pulse circuitry of FIGS. 11a–11d. Either of these position signals are conditioned by a schmitt trigger 457 (FIG. 14) to sharpen these pulses. The sharpened pulses are then fed to the logic and pulse circuit of FIGS. 11a–11d via line 599.

The pulse signals for activating the solenoids are fed from the logic and pulse circuit of FIGS. 11a–11d, via line 594. The activating signal is fed through a set and reset gating arrangement 458 and a "pull-pull" circuit 459 prior to being introduced to solenoids 303 and 304. The solenoids 303 and 304 actuate the "dollars" assembly actuator 305, which in turn sets the corresponding print wheel 392 in the postage meter. Upon tripping the meter and imprinting the postage, the setting is recorded in the ascending and descending registers 393.

The conditioning circuit 475 of FIG. 17, comprises a set and reset gating arrangement 478, which conditions the dollar settings for the logic and pulse circuitry of FIGS. 11a–11d via line 599. A gate 479 provides a signal via line 600 (look), which tells the logic when the disc 451 has settled in a definite zero or dollar position. The conditioning circuit is activated by the two schmitt triggers 457 (zero and dollar circuits of FIG. 18) via lines 476 and 477.

The circuitry of FIG. 18 includes "pull" circuits 459 as shown. The "pull" circuits 459 are actuated by the gating arrangements 458 and 460, respectively. When a high signal is received from the logic and pulse circuit of FIGS. 11a–11d via line 594 to pull solenoid 304 (dollar setting) with the solenoid 304 already in the dollar position, phototransistor 456 will provide a non-complementary high signal to gate 458A of circuit 458 via line 480, and gate 458A will not provide a "low" triggering signal to gate 458B to pull the solenoid 304. Gate 460A of circuit 460 will not trigger solenoid 303 (zero setting) to pull, because the signal from line 594 (carried by line 482) is inverted by gate 458C. Circuit 460 has an extra inverting gate 458C so that the "zero dollars" pull circuit 459 will not be actuated when a "dollars" command is received. Naturally, the "dollars" pull circuit will not be actuated by a "zero dollars" command.

Similarly, when a "zero" (low) signal is received by gate 458C via lines 594 and 482, it is inverted to a high signal. Gate 460A receives this high signal, and if phototransistor 456 does not provide a non-complementary high signal to gate 460A via line 481, as when the disc 451 is in the "zero dollar" position, the solenoid 303 will be actuated.

In order that postage meter 24 make a proper and uniform imprint impression on all thicknesses of mail (to a maximum of ½ inch), there was a need for a movable imprinting deck mechanism as shown in FIGS. 15 and 16. FIG. 15 shows a movable deck mechanism in its home (non-deflected) position. FIG. 16 shows the movable deck mechanism receiving an envelope, which causes the deck 400 to deflect to accommodate the letter.

The deck 400 supports the postage impression roller 401, so that as the deck 400 separates from the adjacent driving belt 402 (FIG. 16) a separation is likewise created between the impression roller 401, and the postage imprint drum 403 of the postage meter 24.

The impression roller 401 is spring loaded toward the postage imprint drum 403, so as to provide imprinting pressure between the roller 401 and drum 403. The deck 400 uniformly separates from the driving belt 402 (FIG. 16) by means of linkage 404. Linkage 404 comprises two links 405 and 406 which contain intermeshing gear surfaces 407 and 408, respectively, at one end thereof. Link 405 is rotatively connected (pin 409) to deck 400 at a letter incoming end. Link 408 is rotatively connected (pin 410) to deck 400 at a letter outgoing end. Links 405 and 406 are respectively pivotable about pins 411 and 412, so that gear surfaces 407 and 408 are engageably movable with respect to each other. Pivot pins 411 and 412 are anchored in frame 415.

Link 406 is connected to crank arm 414 about pin 412. Crank arm 414 is spring loaded by means of spring 416, which is connected to arm 414 about pin 417. The other end of spring 416 is anchored to frame 415 at point 418.

The envelope drive belt is continuously driven about drive wheels 420 and tensioning rollers 421, which are rotatively mounted on a spring biased arm 422.

When deck 400 is in its home position as in FIG. 15, an incoming letter 425 (arrow 430 of FIG. 16) is fed edgewise to the deck, and abuts upon the lip 423 of the deck. This causes the incoming end of the deck to deflect from drive belt 402 (arrow 427) until the envelope is seated between the drive belt 402 and the first of two guide rollers 426. When the forward end of deck 400 is caused to separate from drive belt 402, the rear portion of the deck (generally shown by arrow 428) is likewise made to deflect a like distance due to supporting linkage 404. The linkage mechanism operates in such a manner that the deck 400 moves as a unit, thus providing uniform separation across the whole envelope engaging surface of the deck. The thickness of the envelope is also accommodated by the movable impression roller 401 which is supported upon end 428 of deck 400. The uniform separation of deck elements 400 and 401 provide for a smooth flowing ingress and egress of pieces of mail, as well as insuring a uniform imprinting of postage upon the letter.

The operation of linkage 404 is such that, when a letter causes deflection of deck 400 at its incoming end, link 405 is caused to pivot about pin 411. This in turn causes the gear end 407 of link 405 to move in the direction of arrow 435 (FIG. 15). This movement will result in a corresponding movement (arrow 440) in gear end 408 of supporting line 406. Since both supporting links 405 and 406 are movable like distances, the movement of the entire deck 400 will be uniform. This is so, because both links 405 and 406 support deck 400 at opposite ends of the deck (note supporting pins 409 and 410, respectively).

Drive belt 402 is a frictional belt which grips the incoming letter 425 and drives the envelope over guide rollers 426 to the imprint drum and impression roller 403 and 401, respectively. When the letter is discharged (arrow 450 of FIG. 16) the spring 416 acts upon crank arm 414 to bias link 406, so that it pivots about pin 412 in the direction of arrow 445. This in turn will cause link 405 to pivot about pin 411 in the direction of arrow 446. The pivoting of links 405 and 406 cause deck 400 to return to the home position shown in FIG. 15.

As the envelope 425 approaches (arrow 464) the imprint drum 403, the leading edge of the letter passes between a light emitting diode (LED) 460, and a photodetector 461. When the light is no longer sensed by the photodetector 461, it actuates a motor 462, which starts the imprinting drum 403 turning as shown by arrow 465.

When the letter is imprinted with postage, the envelope passes from under the printing drum 403. The leading edge of the letter then passes through a light emitting diode (LED) 471 and a photodetector 472 disposed adjacent LED 471. When the photodetector 472 senses the leading edge of the envelope, as when it sees light from LED 471, it signals the feeding of a subsequent letter to the imprinting deck.

The speed of the drum 403 is timed in relation with the speed of the incoming letter such that the postage die 470 meets the envelope at the required place in time. Thus, the impression is placed in the upper right-hand corner of the envelope, as the letter moves between roller 401 and the drum 403. Variations in the speed of the drum and the velocity of the incoming letter may be corrected by suitable compensatory controls (not shown).

The present inventive system, being of a complex nature, naturally will suggest many alternatives, changes, and modifications to the skilled practitioner. Such alternatives, changes, and modifications are deemed to lie within those limits encompassing the full spirit and scope of the invention as presented by the appended claims.

What is claimed is:

1. A weighing scale for weighing a piece of mail supported on its edge, comprising:
    a weighing tray physically constructed to receive and support a piece of mail upon an edge thereof, said tray being movably supportable for movement through a weighing range, said tray comprising a horizontally disposed base section and at least one wall member extending from said base section, an edge of a piece of mail to be weighed being received and supported upon said base section, and said wall member lending additional support to the piece of mail for maintaining said piece of mail upon said edge;
    supporting means supporting said weighing tray for movement through a weighing range; and
    measuring means operatively associated with the weighing tray for measuring the degree to which the weighing tray moves through said weighing range when supporting a piece of mail, whereby a weight determination may be made for said piece of mail.

2. The weighing scale of claim 1, wherein said supporting means comprises a pair of leaf-spring members interconnected between said weighing tray and a base support.

3. The high speed weighing scale of claim 2, wherein said measuring means comprises a stationary light source disposed adjacent said tray, means defining a light path originating from said light source and including a light window, shutter means carried by said tray and operable in response to the movement of said tray to limit the amount of light passing through said light window, whereby the amount of light passing through said window is a measure of the weight of a piece of mail which has caused the tray to move.

4. The high speed weighing scale of claim 3, further comprising photodetection means disposed along said light path for detecting the amount of light passing through said light window.

5. The high speed weighing scale of claim 4, wherein said photodetection means comprises a bank of photodetectors arranged substantially in a line.

6. The high speed weighing scale of claim 5, further comprising adjustment means operatively connected to said tray for automatically adjusting the tray to a zero home position.

7. The high speed weighing scale of claim 6, wherein the adjustment means comprises a coil spring connected to said weighing tray, a lead screw connected to said coil spring, a motor connected to said lead screw for turning said lead screw and thereby exerting a spring force upon said tray by varying the length of said coil spring, said motor operatively connected and responsive to a first one of said photodetectors which determines a deviation in the zero home position for said tray, said spring force exerted upon the tray acting to adjust the position of said weighing tray back to a true zero home position.

8. The high speed weighing scale of claim 7, wherein said coil spring has a spring rate which is a fraction of the combined spring rate of the leaf springs.

9. The high speed weighing scale of claim 8, wherein the spring rate of said coil spring is 1/20th of the combined spring rate of said leaf springs.

10. The high speed weighing scale of claim 5, further comprising orientation means for changing the orientation of the line of photodetectors with respect to said light path, whereby variations in spring rate of said leaf springs can be compensated for by changing an operative light receiving distance between said photodetectors.

* * * * *